United States Patent
Jasper et al.

(10) Patent No.: US 9,175,219 B2
(45) Date of Patent: Nov. 3, 2015

(54) COMPOUNDS FOR A LIQUID CRYSTALLINE MEDIUM AND USE THEREOF FOR HIGH FREQUENCY COMPONENTS

(75) Inventors: Christian Jasper, Seligenstadt (DE); Elvira Montenegro, Weinheim (DE); Detlef Pauluth, Ober-Ramstadt (DE); Volker Reiffenrath, Rossdorf (DE); Atsutaka Manabe, Bensheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/978,656

(22) PCT Filed: Dec. 14, 2011

(86) PCT No.: PCT/EP2011/006290
§ 371 (c)(1),
(2), (4) Date: Jul. 8, 2013

(87) PCT Pub. No.: WO2012/095139
PCT Pub. Date: Jul. 19, 2012

(65) Prior Publication Data
US 2013/0277611 A1    Oct. 24, 2013

(30) Foreign Application Priority Data
Jan. 10, 2011   (DE) .......................... 10 2011 008 207

(51) Int. Cl.
C09K 19/32    (2006.01)
C09K 19/34    (2006.01)
C09K 19/30    (2006.01)

(52) U.S. Cl.
CPC ......... *C09K 19/3491* (2013.01); *C09K 19/3001* (2013.01); *C09K 19/322* (2013.01); *C09K 2019/301* (2013.01); *C09K 2019/3009* (2013.01); *C09K 2019/3016* (2013.01); *C09K 2019/3021* (2013.01); *C09K 2019/3037* (2013.01); *C09K 2219/11* (2013.01)

(58) Field of Classification Search
CPC .......... C09K 2219/11; C09K 19/3491; C09K 19/3001; C09K 19/322; C09K 19/32; C09K 2019/3009; C09K 2019/301; C09K 2019/3016; C09K 2019/3021; C09K 2019/3037
USPC ............... 252/299.01, 299.6, 299.61–299.63; 428/1.1; 549/80; 556/489; 562/30; 568/6; 570/182, 183; 585/26
See application file for complete search history.

(56) References Cited

U.S. PATENT DOCUMENTS

| | | | |
|---|---|---|---|
| 6,849,202 B2 | 2/2005 | Sekine et al. | |
| 7,135,579 B2 | 11/2006 | Sekine et al. | |
| 7,361,288 B2 | 4/2008 | Lussem et al. | |
| 7,550,093 B2 * | 6/2009 | Seo et al. | 252/299.01 |
| 8,217,389 B2 | 7/2012 | Nakano et al. | |
| 8,455,563 B2 | 6/2013 | Parri et al. | |
| 2002/0110650 A1 | 8/2002 | Sekine et al. | |
| 2004/0232384 A1 | 11/2004 | Sekine et al. | |
| 2005/0067605 A1 | 3/2005 | Lussem et al. | |
| 2007/0057229 A1 | 3/2007 | Sekin et al. | |
| 2008/0139824 A1 | 6/2008 | Sekine et al. | |
| 2010/0012929 A1 | 1/2010 | Nakano et al. | |
| 2011/0178200 A1 | 7/2011 | Parri et al. | |

FOREIGN PATENT DOCUMENTS

| | | |
|---|---|---|
| DE | 10 2004 029429 | 2/2005 |
| EP | 2 073 290 | 6/2009 |
| JP | 2004 082439 | 3/2004 |
| JP | 2005 120208 | 5/2012 |
| WO | WO-2009 086911 | 7/2009 |

OTHER PUBLICATIONS

Babudri, F. et al., "Synthesis of Oligoarylenevinylenes with Fluorinated Double bonds," Synthesis, 2008, vol. 10, pp. 1580-1588.
Chang, C. et al., "Synthesis of laterally substituted alpha-methylstilbene-talane liquid crystals," Liquid Crystals, Jan. 2008, vol. 35, No. 1, pp. 1-9.
Gauza, S. et al., "Super High Birefringence Isothiocyanato Biphenyl-Bistolane Liquid Crystals," Japanese Journal of Applied Physics, 2004, vol. 43, No. 11A, pp. 7634-7638.
Hsu, C. S. et al., "Synthesis of laterally substituted bistolane liquid crystals," Liquid Crystals, 2000, vol. 27, No. 2, pp. 283-287.
International Search Report for PCT/EP2011/006290, Date of completion of the international Search: Apr. 5, 2012. Date of mailing of the international search report: Apr. 17, 2012.
Liao, Y. et al., "High Birefringence Isothiocyanato Bistolaine Liquid Crystals for Displays Application,"International Display Manufacturing Conference, Feb. 21, 2005, XP008150259.
Liao, Y. et al., "Synthesis and mesomorphic properties of super high birefringence isothiocyanato bistolane liquid crystals," Liquid Crystals, Apr. 2007, vol. 34, No. 4, pp. 507-517.
Spells, D. J. et al., "Synthesis of terminally substituted stilbene-tolane liquid crystals," Liquid Crystals, 2002, vol. 29, No. 12, pp. 1529-1532.
Wu, S. et al., "High-birefringence and wide nematic range bis-tolane liquid crystals," Applied Physics Letter, Jan. 18, 1999, vol. 74, No. 3, pp. 344-346.
Mitsui Chemicals Inc., "Optical Recording Medium and Diaryl Acetylenic Compound," Patent Abstracts of Japan, Publication Date: Mar. 18, 2004; English Abstract of JP-2004 082439.
Dainippon Ink & Chem Inc., "Variable Function Device," Patent Abstracts of Japan, Publication Date: May 12, 2005: English Abstract of JP-2005 120208.

* cited by examiner

*Primary Examiner* — Geraldina Visconti
(74) *Attorney, Agent, or Firm* — Millen, White, Zelano & Branigan, P.C.

(57) ABSTRACT

The present invention relates to compounds containing at least three ring systems, at least one of which is a 2,6-naphthylene group, and two unsaturated bridging groups between the ring systems, and to the use of the compounds for high-frequency components, in particular antennae, especially for the gigahertz region. The liquid-crystalline media comprising these compounds serve, for example, for the phase shifting of microwaves for tuneable 'phased-array' antennae.

22 Claims, No Drawings

COMPOUNDS FOR A LIQUID CRYSTALLINE MEDIUM AND USE THEREOF FOR HIGH FREQUENCY COMPONENTS

The present invention relates to compounds containing at least three ring systems, at least one of which is a 2,6-naphthylene group, and two unsaturated bridging groups between the ring systems, and to the use of the compounds for high-frequency components, to liquid-crystalline media comprising the compounds, and to high-frequency components, in particular antennae, especially for the gigahertz region, comprising these media. The liquid-crystalline media serve, for example, for the phase shifting of microwaves for tuneable 'phased-array' antennae.

Liquid-crystalline media have been used for some time in electro-optical displays (liquid crystal displays—LCDs) in order to display information.

1,4-Diethynylbenzene derivatives are proposed as liquid-crystalline components in the specifications EP 0968988 A1, DE 19907941 A1, DE 10120024 A1 and JP 08012599 A. Compounds containing a 2,6-naphthylene group are not disclosed therein.

1-(Phenylethynyl)tolans, also called bistolan compounds below, having an alkyl substitution on the central phenylene ring are known to the person skilled in the art. For example, the publication S.-T. Wu, C.-S. Hsu, K.-F. Shyu *Appl. Phys. Lett.* (1999), 74 (3), 344-346, discloses various liquid-crystalline bistolan compounds containing a lateral methyl group, of the formula

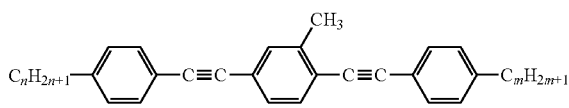

Besides liquid-crystalline bistolan compounds of this type containing a lateral methyl group, C. S. Hsu, K. F. Shyu, Y. Y. Chuang, S.-T. Wu *Liq. Cryst.* (2000), 27 (2), 283-287, also discloses corresponding compounds containing a lateral ethyl group and proposes the use thereof, inter alia, in "liquid crystal optically phased arrays".

Liao et al. in Int. Display Manufacturing Conference, Feb. 21-24, 2005, Wed-P3-10, disclose isothiocyanate compounds of the formula

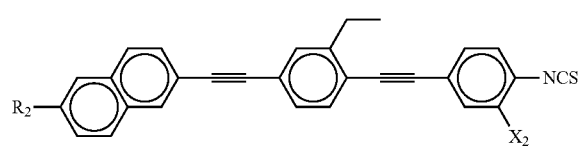

in which $X_2$ denotes H or F, and $R_2$ denotes an alkyl chain having 2 to 5 C atoms, as liquid-crystalline substances.

Gauza et al. in Jap. J. Appl. Phys. (2004), 43, 7634-7638, likewise disclose an isothiocyanate compound of the formula

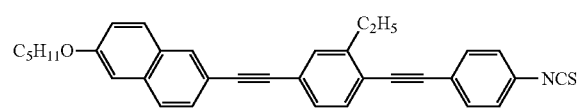

and a liquid-crystalline medium comprising this compound.

These publications do not report any use as medium for high-frequency applications.

The publication D. J. Spells et al. (2002), Liquid Crystals, 29 (12), 1529-32, discloses so-called stilbene-tolan compounds. However, the compounds do not carry a 2,6-naphthylene group. The publication Chin-Yen Chang et al. (2008), Liquid Crystals, 35 (1), 1-9, likewise discloses stilbene-tolan compounds which contain an α-methylstilbene group, but no 2,6-naphthylene group. The publication F. Babudri et al. (2008), Synthesis, 10, 1580-1588, discloses oligoarylenevinylenes, which also include bisdifluorostilbenes. The compounds are substituted by a number of different polar groups (acids, esters, OH) on the aryl rings and potentially serve as organic semiconductors. Nothing is reported therein on the liquid-crystalline properties.

Compounds of the Formulae

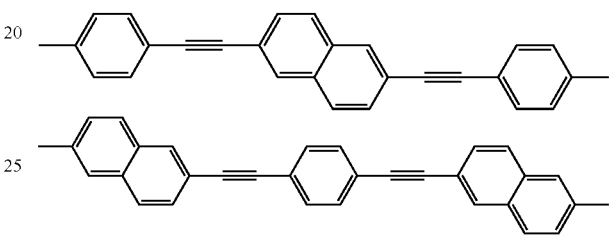

and similar derivatives are described as constituents of organic thin-film transistors (EP 2 073 290 A1, WO 2008/044695 A1) and as constituents of data recording media (JP 2004-082439 A). Liquid-crystalline properties and the use thereof in liquid-crystalline media have not been described hitherto.

Similar phenylacetylenes containing 2,6-naphthalene systems are disclosed in US 2002/0110650 as liquid crystals having high optical anisotropy.

However, liquid-crystalline media have recently also been proposed for use in components for microwave technology, such as, for example, in DE 10 2004 029 429 A and in JP 2005-120208 (A).

DE 10 2004 029 429 A (cf. above) describes the use of conventional liquid-crystal media in microwave technology, inter alia in phase shifters. Liquid-crystalline media have already been investigated therein with respect to their properties in the corresponding frequency range.

An industrially valuable application of liquid-crystalline media in high-frequency technology is based on their property that their dielectric properties can be controlled by a variable voltage, particularly for the gigahertz region. Thus, tuneable antennae can be designed which contain no moving parts (A. Gaebler, A. Moessinger, F. Goelden, et al., "Liquid CrystalReconfigurable Antenna Concepts for Space Applications at Microwave and Millimeter Waves", International Journal of Antennas and Propagation, Vol. 2009, Article ID 876989, 7 pages, 2009. doi:10.1155/2009/876989).

The publication A. Penirschke, S. Müller, P. Scheele, C. Weil, M. Wittek, C. Hock and R. Jakoby: "Cavity Perturbation Method for Characterization of Liquid Crystals up to 35 GHz", Proc. 34th European Microwave Conf. 2 (2004), Amsterdam, 545-548, describes, inter alia, the properties of the known, liquid-crystalline single substance K15 (Merck KGaA, Germany) at a frequency of 9 GHz.

However, the compositions or individual compounds known to date are generally afflicted with disadvantages.

Most of them result, besides other deficiencies, in disadvantageously high losses and/or inadequate phase shifts or inadequate material quality.

For use in high-frequency technology, liquid-crystalline media having particular, hitherto rather unusual, non-standard properties, or combinations of properties, are required.

Thus, novel components for liquid-crystalline media having improved properties are necessary. In particular, the loss in the microwave region must be reduced and the material quality (TO must be improved. For tuneable antennae, liquid-crystalline media having a fast reaction time to a change in the voltage between the electrodes of the cell are also required.

In addition, there is a need to improve the low-temperature behaviour of the components. Both an improvement in the operating properties and also in the shelf life are necessary here.

There is therefore a considerable demand for liquid-crystalline media having suitable properties for corresponding practical applications.

Surprisingly, it has been found that the compounds according to the invention have a high clearing point (transition from the nematic phase into the isotropic phase). At the same time, the loss factor in the microwave region is relatively low and the material quality ($\eta$) is very high. In addition, the naphthalene compounds according to the invention have extremely high optical anisotropy ($\Delta n$), which is significantly above that of benzene compounds of the same type. Utilising this effect, it has now been found, surprisingly, that liquid-crystalline media having a suitable, nematic phase range and high $\Delta n$ which do not have the disadvantages of the materials of the prior art or at least only do so to a considerably reduced extent can be achieved with the compounds according to the invention.

A first aspect of the invention relates to the use of compounds of the formula I,

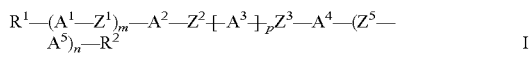

in which $A^1, A^2, A^3, A^4, A^5$ each, independently of one another, also if they occur more than once, denote
  a) 1,4-phenylene, in which one or more, preferably one to two,
  CH groups may be replaced by N, or a 2,6-naphthylene group of the formula

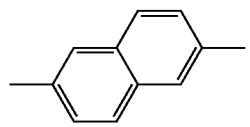

b) a radical from the group thiophene-2,5-diyl, furan-2,5-diyl or a group of the formula

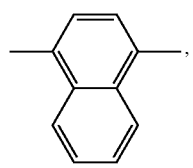

or
  c) trans-1,4-cyclohexylene or cyclohexenylene, in which, in addition, one or two non-adjacent $CH_2$ groups may be replaced by —O— and/or —S—, and in which H may be replaced by F, 1,4-bicyclo[2.2.2]octylene, cyclobutane-1,3-diyl or spiro[3.3]heptane-2,6-diyl,
  and in which, in groups a), b) and c),
  one or more H atoms may also be substituted by a group as defined for L,
where one or more of the groups $A^2, A^3$ and $A^4$ denote a group of the formula

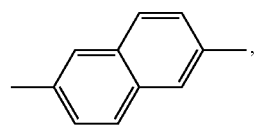

L independently denotes branched or unbranched alkyl having 1 to 12 C atoms, alkenyl or alkynyl having 2 to 12 C atoms,
  in which in each case, independently of one another, one or more hydrogen atoms may be replaced by F or Cl and, in addition, one or more "—$CH_2$—" groups may be replaced by O, or denotes $C_3$-$C_6$ cycloalkyl or $C_3$-$C_6$ cycloalkenyl,
  F, Cl, Br, CN, NCS, SCN or $SF_5$,
$Z^2, Z^3$ independently denote —C≡C— or

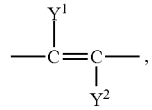

$Y^1, Y^2$, independently of one another, denote H, F, Cl, $C_1$-$C_{10}$ alkyl,
$Z^1, Z^5$, independently of one another, denote a single bond, —C≡C—, —CH=CH—, —$CH_2$O—, —(CO)O—, —$CF_2$O—, —$CF_2CF_2$—, —$CH_2CF_2$—, —$CH_2CH_2$—, —$(CH_2)_4$—, —CH=CF— or —CF=CF—, where asymmetrical bridges may be oriented to both sides,
$R^1$ and $R^2$, independently of one another, denote a halogenated or unsubstituted alkyl radical having 1 to 15 C atoms, where, in addition, one or more $CH_2$ groups in these radicals may each be replaced, independently of one another, by —C≡C—, —CH=CH—, —CF=CF—, —CF=CH—, —CH=CF—, —(CO)—, —S— and —O— in such a way that S or O atoms are not linked directly to one another, or denote F, Cl, Br, CN, $CF_3$, $OCF_3$, —NCS or $SF_5$, $R^2$ also denotes H,
m, n, independently of one another, denote 0, 1 or 2, and
p denotes 1 or 2,
in a component for high-frequency technology, in particular in a phase shifter or a plurality of functionally connected phase shifters or in an antenna. The component or phase shifter comprises a liquid-crystalline medium comprising one or more compounds of the formula I. In general, the antenna is a 'phased array' antenna or a microwave component. The component, antenna or phase shifter is preferably tuneable.

A second aspect of the invention relates to compounds of the formula I*,

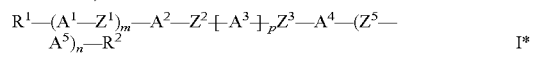

in which
$A^1, A^2, A^3, A^4, A^5$ each, independently of one another, also if they occur more than once, denote
  a) 1,4-phenylene, in which one or more, preferably one to two, CH groups may be replaced by N, or a 2,6-naphthylene group of the formula

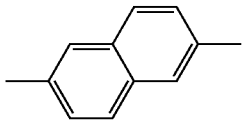

b) a radical from the group thiophene-2,5-diyl, furan-2,5-diyl or a group of the formula

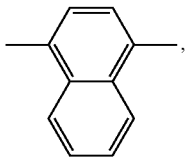

or c) trans-1,4-cyclohexylene or cyclohexenylene, in which, in addition, one or two non-adjacent CH$_2$ groups may be replaced by —O— and/or —S—, and in which H may be replaced by F, 1,4-bicyclo[2.2.2]octylene, cyclobutane-1,3-diyl or spiro[3.3]heptane-2,6-diyl, and in which, in groups a), b) and c), one or more H atoms may also be substituted by a group as defined for L, where one or more of the groups A$^2$, A$^3$ and A$^4$ denote a group of the formula

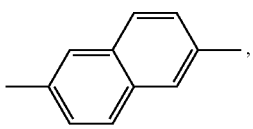

and where the groups A$^2$, A$^3$ and A$^4$ are substituted by a total of at least one or more groups L, L independently denotes branched or unbranched alkyl having 1 to 12 C atoms, alkenyl or alkynyl having 2 to 12 C atoms, in which in each case, independently of one another, one or more hydrogen atoms may be replaced by F or Cl and, in addition, one or more "—CH$_2$—" groups may be replaced by O, or denotes C$_3$-C$_6$ cycloalkyl or C$_3$-C$_6$ cycloalkenyl, F, Cl, Br, CN, NCS, SCN or SF$_5$, Z$^2$, Z$^3$ denote —C≡C— or

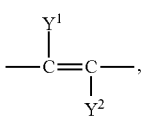

Y$^1$, Y$^2$, independently of one another, denote H, F, Cl, C$_1$-C$_{10}$ alkyl, Z$^1$, Z$^5$, independently of one another, denote a single bond, —C≡C—, —CH=CH—, —CH$_2$O—, —(CO)O—, —CF$_2$O—, —CF$_2$CF$_2$—, —CH$_2$CF$_2$—, —CH$_2$CH$_2$—, —(CH$_2$)$_4$—, —CH=CF— or —CF=CF—, where asymmetrical bridges may be oriented to both sides, R$^1$ and R$^2$, independently of one another, denote a halogenated or unsubstituted alkyl radical having 1 to 15 C atoms, where, in addition, one or more CH$_2$ groups in these radicals may each be replaced, independently of one another, by —C≡C—, —CH=CH—, —CF=CF—, —CF=CH—, —CH=CF—, —(CO)—, —S— and —O— in such a way that S or O atoms are not linked directly to one another, or denote F, Cl, Br, CN, CF$_3$, OCF$_3$ or SF$_5$, R$^2$ also denotes H, m, n, independently of one another, denote 0, 1 or 2, and p denotes 1 or 2.

The compounds of the formula I used in accordance with the invention also include compounds containing an end group —NCS and compounds which do not contain a lateral group L (cf. Claim 1). These are preferably compounds of the formula I* and the preferred sub-forms. The compounds of the formulae I and I* are also jointly referred to below as compounds of the formula I, unless reference is explicitly made to compounds of the formula I "used in accordance with the invention".

The compounds of the formula I contain at least three ring systems, including at least one 2,6-naphthylene group, which are connected by certain bridging groups (Z$^{2/3}$, optionally Z$^{1/5}$).

The double bonds of the formula —CY$^1$=CY$^2$— between the rings A$^1$ to A$^5$, if present, and optional double bonds in the groups R$^1$ and R$^2$ preferably have the trans-configuration (E-configuration).

The compounds of the formula I have a high clearing point, a low melting point and extremely high optical anisotropy (Δn). The relatively low loss factor in the microwave spectrum, the high value of the tuneability and the resultant high material quality are advantageous. The compounds, alone or in a mixture with further mesogenic components, have a nematic phase over a broad temperature range. These properties make them particularly suitable for use in components for high-frequency technology, in particular in liquid-crystalline phase shifters. Liquid-crystalline media according to the invention have the corresponding properties, for example a broad phase range and in addition good low-temperature stability. Preferred compounds of the formula I are characterised by the choice of one or more of the following parameters:

The index m is preferably 0 or 1, particularly preferably 0. The index n is preferably 0 or 1, particularly preferably 0. m+n is preferably 0 or 1. m+n+p is preferably 1 or 2, i.e. the total number of ring systems in formula I is preferably 3 or 4.

The groups A$^2$, A$^3$ and A$^4$ are particularly preferably substituted by a total of one, two, three or four groups L.

Preferably, two or three groups from A$^2$, A$^3$ and A$^4$, preferably three, are a group as defined under a) or b), preferably under a). One or more H atoms may also be substituted by a group as defined for L.

The one or more groups A$^3$ preferably denote a 2,6-naphthylene group, preferably one, and p is preferably 1.

One of the groups A$^2$, A$^3$ or A$^4$ is particularly preferably substituted by at least one group L and particularly preferably has a structure of the formula

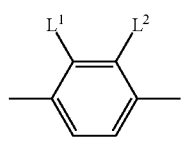

in which

L¹ and L² independently denote H or L, where preferably at least L¹ or L² adopts a meaning of L, i.e. does not denote H.

In the case of compounds having high dielectric anisotropy, one of the groups $A^2$ and $A^4$ is substituted by up to two fluorine atoms, which are preferably in the ortho-position to the terminal substituents $R^1/R^2$.

The ring groups $A^1$ and $A^5$, if present, are, independently of one another, preferably a 1,4-phenylene, in which, in addition, one or more H atoms may be replaced, independently of one another, by a group as defined for L.

The bridging groups $Z^1$ and $Z^5$, if present, are, independently of one another, preferably a single bond, —C≡C—, —CF=CF— or —CH=CH—, particularly preferably a single bond. These groups support, inter alia, a high Δn value and good phase properties.

Preferably, one of $Z^2$ and $Z^3$ is a —C≡C— group and the other is a —CF=CF— group, or both are a —C≡C— group. Particularly preferably, one of $Z^2$ and $Z^3$ is a —C≡C— group and the other is a —CF=CF— group; in this combination, a particularly broad liquid-crystalline phase range is achieved.

$Y^1/Y^2$ are preferably H/F, F/H, F/F, Cl/F, $CH_3$/F, F/$CH_3$ or F/Cl and particularly preferably F/F.

One of the radicals $R^1$ or $R^2$, preferably $R^1$, preferably denotes a straight-chain alkyl radical having 1 to 15 C atoms, where, in addition, one or more $CH_2$ groups in these radicals may each be replaced, independently of one another, by —C≡C—, —CH=CH—, —(CO)O—, —O(CO)—, —(CO)—, —S— or —O— in such a way that O atoms are not linked directly to one another. The groups $R^1$ and $R^2$ are preferably both an alkyl having 2 to 7 C atoms. In this case, $R^1$ and $R^2$ denote, for example, propyl and hexyl or butyl and butyl, furthermore propyl and pentyl, propyl and hexyl or butyl and pentyl.

In a further preferred embodiment of the invention, the group $R^1$ or $R^2$ is a polar group (F, Cl, CN, a halogenated alkyl or halogenated alkoxy radical having 1 to 5 C atoms, in particular $CF_3$ or $OCF_3$ or $SF_5$). The corresponding compounds of the formula I have clearly positive dielectric anisotropy (Δε). The Δε value is preferably 3 or more.

One of the ring groups $A^{1-5}$ preferably has a part-structure selected from the following formulae:

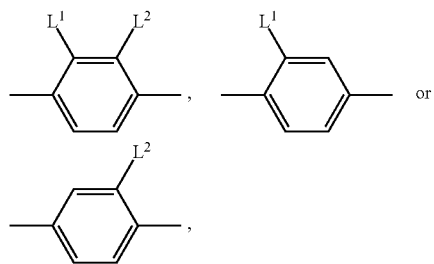

in which $L^{1/2}$ are as defined for L and particularly preferably denote F, methyl or ethyl.

The 2,6-naphthylene group may be unsubstituted or likewise substituted. It is preferably unsubstituted. It preferably has one of the following meanings:

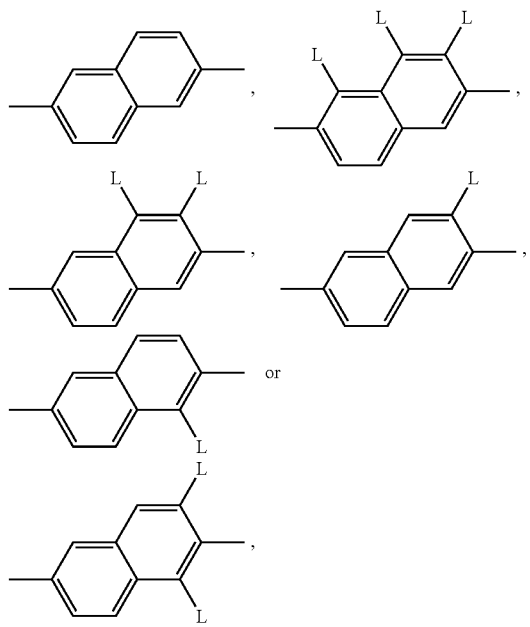

where these radicals may be directed to both sides, and L here preferably denotes F.

The groups $L^1$ and $L^2$ or L in the formulae mentioned above and below preferably each, independently of one another, denote F, Cl, CN, branched or unbranched alkyl, alkenyl or alkynyl having 1 to 8 C atoms, in which, independently of one another, one or more hydrogen atoms may be replaced by F or Cl and, in addition, one or more "—$CH_2$—" groups may be replaced by O, or denote substituted or unsubstituted cycloalkyl or cycloalkenyl, particularly preferably F, Cl, alkyl having 1 to 5 C atoms, alkenyl having 2 to 5 C atoms, cyclopropyl or cyclobutyl. Preferably, one group from $L^{1/2}$ is an F, methyl, ethyl, cyclopropyl or Cl, particularly preferably F, and the other group is as defined above, or is preferably F, Cl, alkyl having 1 to 5 C atoms, alkenyl having 2 to 5 C atoms, cyclopropyl or cyclobutyl.

Besides a difluoroethylene bridge, particular preference is given to a group $A^{1-5}$ which is unsubstituted or monosubstituted in such a way that the optional substituent L points to the side facing away from the fluoroethylene bridge:

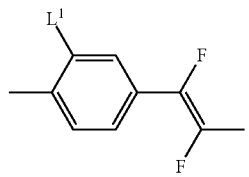

In the case where p=2, both rings $A^3$ preferably, but not exclusively, together denote a biphenyl group selected from the following formulae:

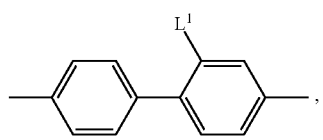

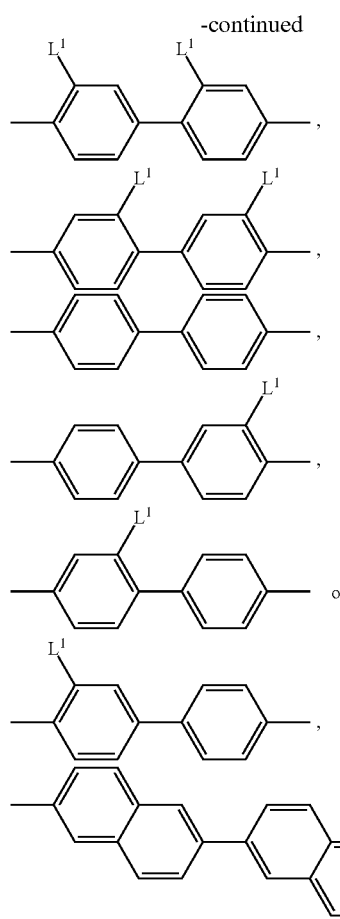
in which L¹ is as defined for L.
Preferred embodiments of the invention are therefore represented by the following illustrative structures:
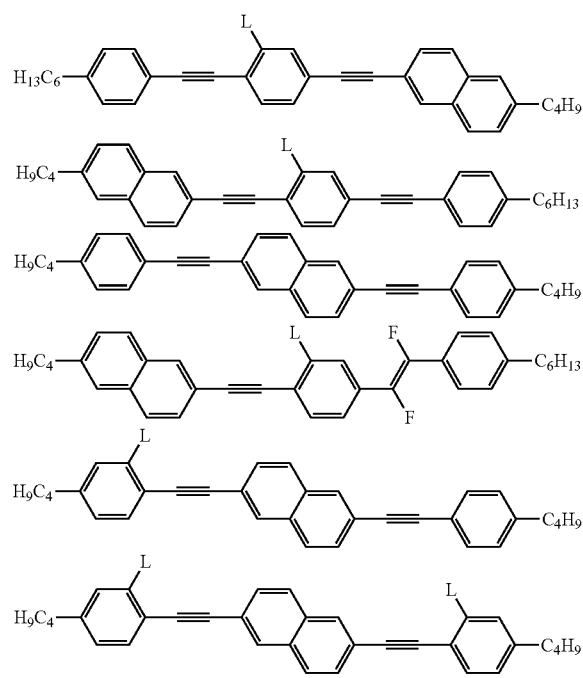
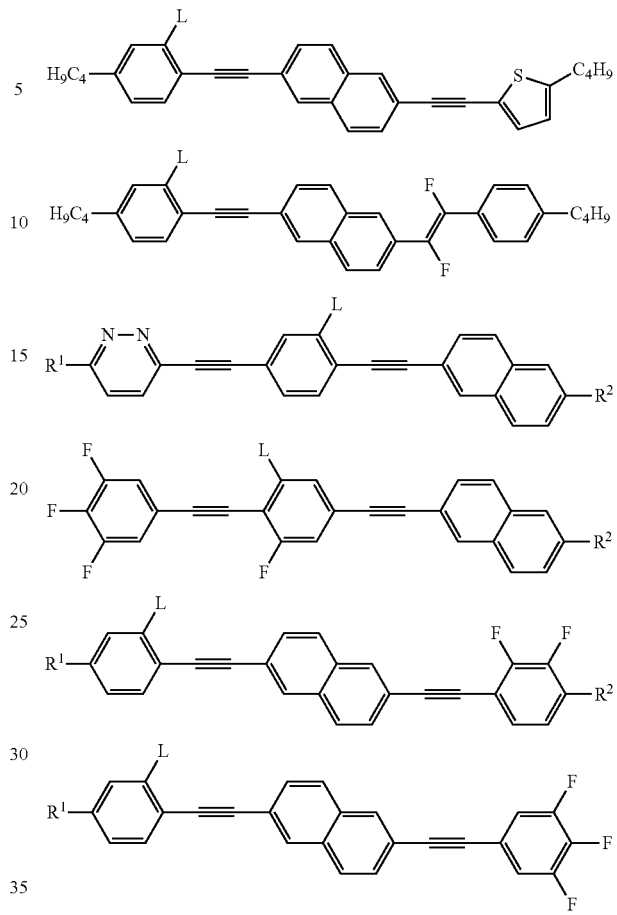
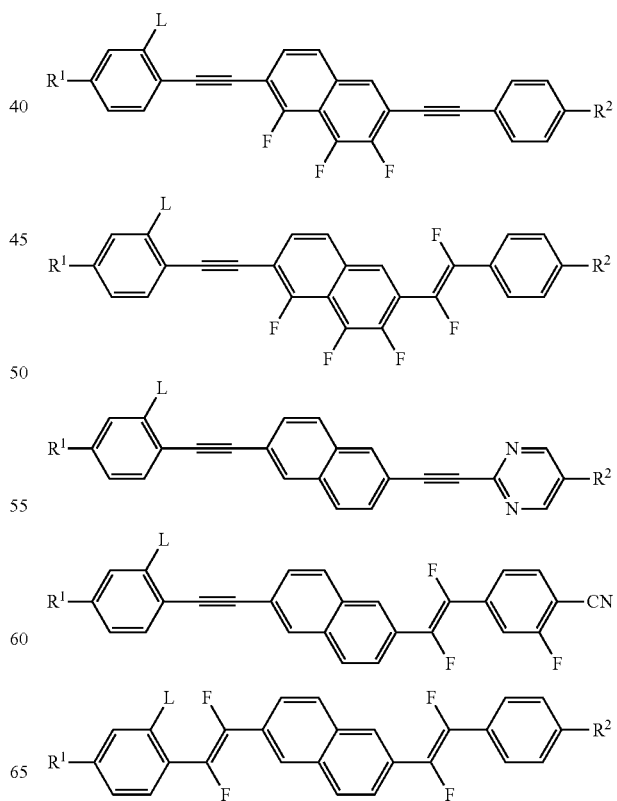

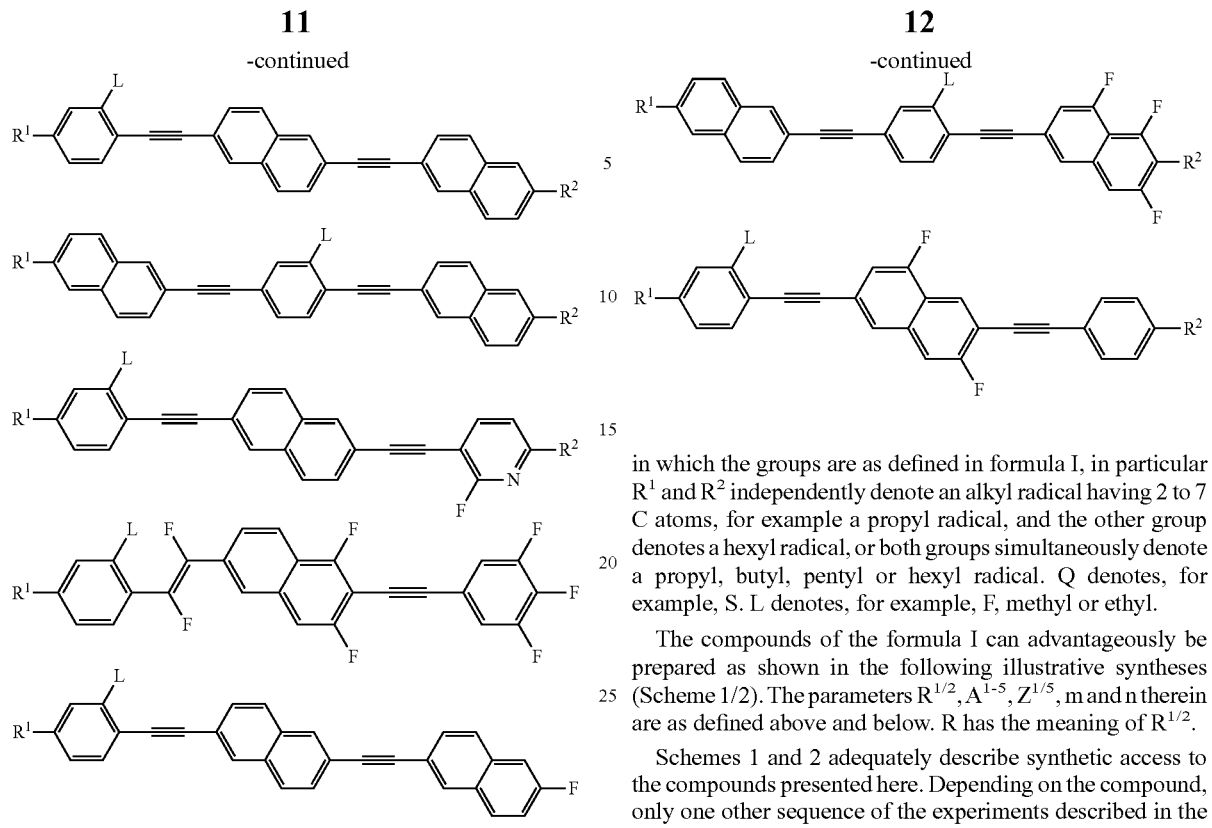

in which the groups are as defined in formula I, in particular $R^1$ and $R^2$ independently denote an alkyl radical having 2 to 7 C atoms, for example a propyl radical, and the other group denotes a hexyl radical, or both groups simultaneously denote a propyl, butyl, pentyl or hexyl radical. Q denotes, for example, S. L denotes, for example, F, methyl or ethyl.

The compounds of the formula I can advantageously be prepared as shown in the following illustrative syntheses (Scheme 1/2). The parameters $R^{1/2}$, $A^{1-5}$, $Z^{1/5}$, m and n therein are as defined above and below. R has the meaning of $R^{1/2}$.

Schemes 1 and 2 adequately describe synthetic access to the compounds presented here. Depending on the compound, only one other sequence of the experiments described in the example part arises.

Scheme 1.

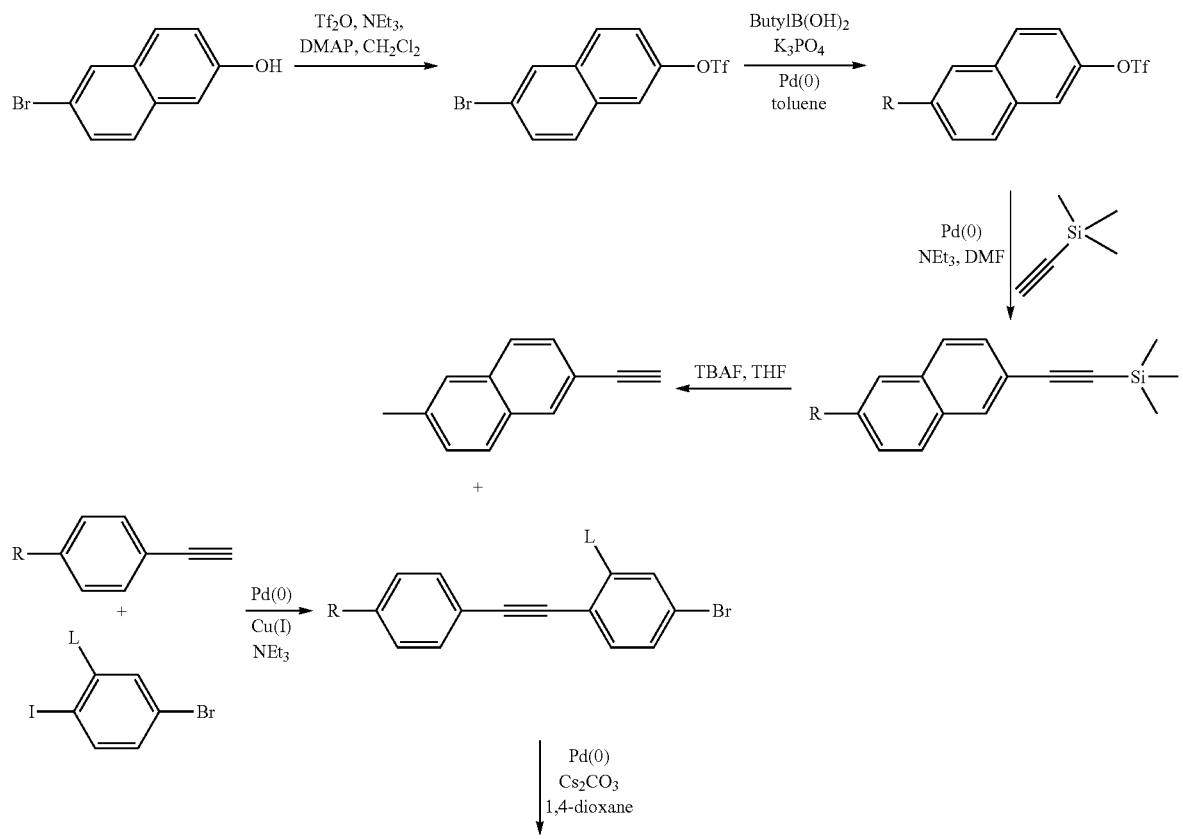

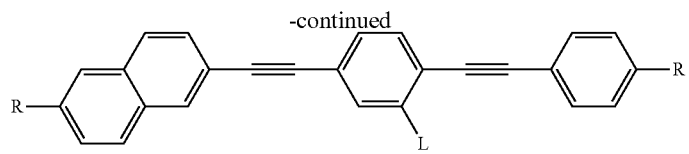

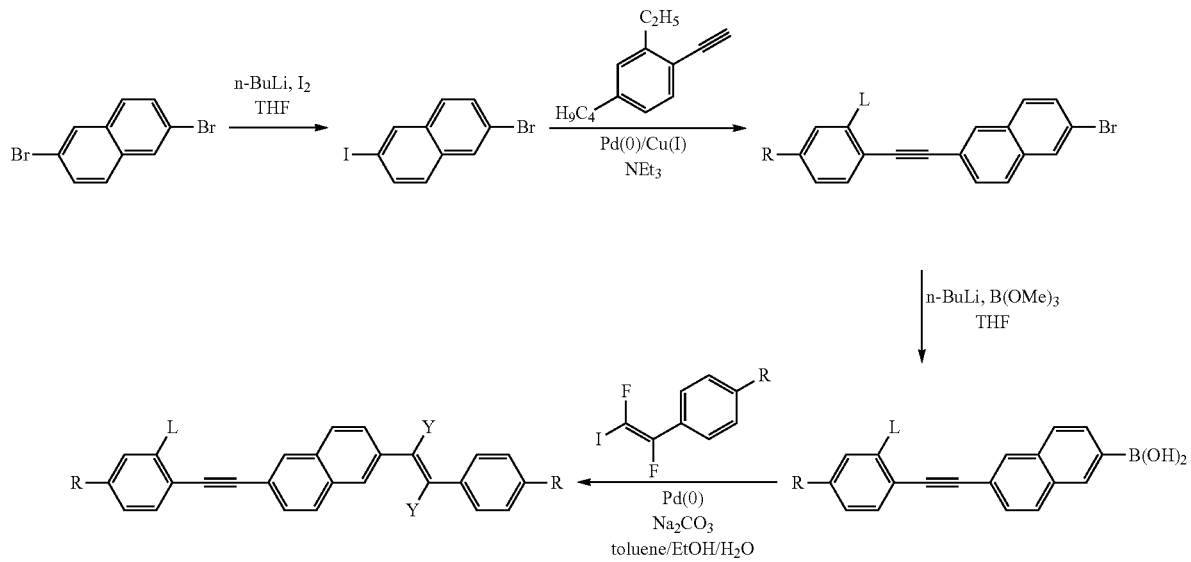

Schemes 1 and 2 show the synthesis of certain compounds. The radicals "R" can be generalised independently here to any desired radicals —$A^2$—$(Z^1$—$A^1)_m$—$R^1$ or —$A^4$—$(Z^5$-$A^5)_n$—$R^2$ in accordance with formula I. Likewise, the central ring can be correspondingly broadened in its meaning by a radical -$[A^3]_p$- in accordance with formula I. The substituent L may be present one or more times at different positions.

The liquid-crystalline media in accordance with the present invention comprise one or more compounds of the formula I and optionally at least one further, preferably mesogenic compound. The liquid-crystal medium therefore preferably comprises two or more compounds which are preferably liquid-crystalline. Preferred media comprise the preferred compounds of the formula I.

Further components of the liquid-crystalline media are preferably selected from the compounds of the formula II:

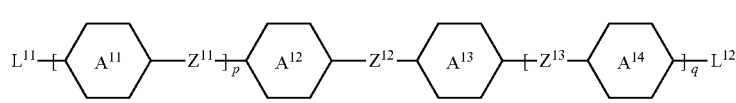

in which
$L^{11}$ denotes $R^{11}$ or $X^{11}$,
$L^{12}$ denotes $R^{12}$ or $X^{12}$,
$R^{11}$ and $R^{12}$, independently of one another, denote unfluorinated alkyl or unfluorinated alkoxy having 1 to 17, preferably having 3 to 10, C atoms or unfluorinated alkenyl, unfluorinated alkynyl, unfluorinated alkenyloxy or unfluorinated alkoxyalkyl having 2 to 15, preferably 3 to 10, C atoms, preferably alkyl or unfluorinated alkenyl, $X^{11}$ and $X^{12}$, independently of one another, denote F, Cl, Br, —CN, —NCS, —SCN, —$SF_5$, fluorinated alkyl or fluorinated alkoxy having 1 to 7 C atoms or fluorinated alkenyl, fluorinated alkenyloxy or fluorinated alkoxyalkyl having 2 to 7 C atoms, preferably fluorinated alkoxy, fluorinated alkenyloxy, F or Cl, p, q independently denote 0 or 1, $Z^{11}$ to $Z^{13}$, independently of one another, denote trans-CH=CH—, trans-CF=CF—, —C≡C— or a single bond, and

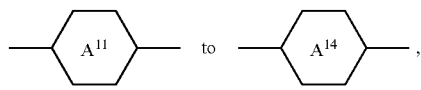

independently of one another, denote

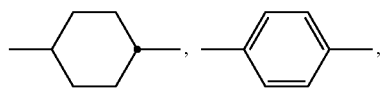

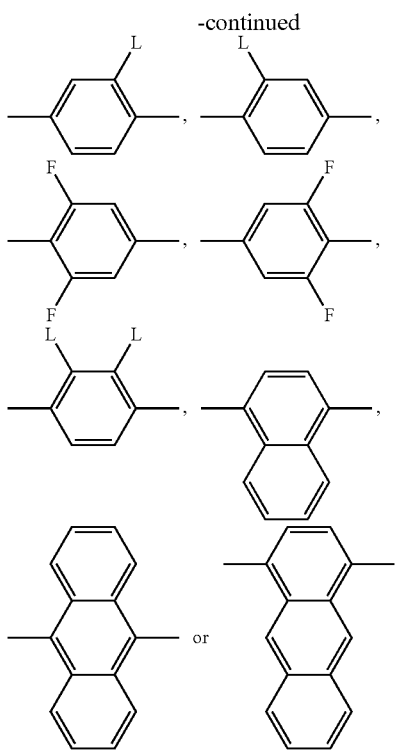

in which L independently denotes branched or unbranched alkyl, alkenyl or alkynyl having 1 to 12 C atoms, in which, independently of one another, one or more "—CH$_2$—" groups may also be replaced by O, or denotes $C_3$-$C_6$ cycloalkyl, $C_3$-$C_6$ cycloalkenyl, fluorinated alkyl or alkenyl, fluorinated alkoxy or alkenyloxy, F, Cl, Br, CN, NCS, SCN or SF$_5$.

In a preferred embodiment of the present invention, the liquid-crystalline media comprise one or more compounds of the formula I and one or more compounds of the formula II.

The liquid-crystalline media in accordance with the present application preferably comprise in total 5 to 95%, preferably 10 to 90% and particularly preferably 15 to 80%, of compounds of the formula I.

The liquid-crystalline media in accordance with the present invention preferably comprise, more preferably predominantly consist of, even more preferably essentially consist of and very preferably completely consist of compounds selected from the group of the compounds of the formulae I and II.

In this application, "comprise" in connection with compositions means that the entity in question, i.e. the medium or the component, comprises the component or components or compound or compounds indicated, preferably in a total concentration of 10% or more and very preferably 20% or more.

In this connection, "predominantly consist of" means that the entity in question comprises 55% or more, preferably 60% or more and very preferably 70% or more, of the component or components or compound or compounds indicated.

In this connection, "essentially consist of" means that the entity in question comprises 80% or more, preferably 90% or more and very preferably 95% or more, of the component or components or compound or compounds indicated.

In this connection, "completely consist of" means that the entity in question comprises 98% or more, preferably 99% or more and very preferably 100.0%, of the component or components or compound or compounds indicated.

The liquid-crystalline media in accordance with the present application preferably comprise in total 10 to 100%, preferably 20 to 95% and particularly preferably 25 to 90%, of compounds of the formulae I and II.

In accordance with the present invention, the compounds of the formula II are preferably used in a total concentration of 10% to 90%, more preferably 15% to 85%, even more preferably 25% to 80% and very preferably 30% to 75%, of the mixture as a whole.

In addition, the liquid-crystalline media may comprise further additives, such as stabilisers, chiral dopants and nanoparticles. The individual, added compounds are employed in concentrations of 0.005 to 6%, preferably 0.1 to 3%. The total concentration of these further constituents is in the range from 0% to 10%, preferably 0.1% to 6%, based on the mixture as a whole. However, the concentration data for the remaining constituents of the liquid-crystal mixtures, i.e. the liquid-crystalline or mesogenic compounds, are indicated without taking into account the concentration of these additives.

The liquid-crystalline media preferably comprise 0 to 10% by weight, in particular 0.01 to 5% by weight and particularly preferably 0.1 to 3% by weight, of stabilisers. The media preferably comprise one or more stabilisers selected from 2,6-di-tert-butylphenols, 2,2,6,6-tetramethylpiperidines or 2-benzotriazol-2-ylphenols. These assistants are known to the person skilled in the art and are commercially available, for example as light stabilisers.

An embodiment of the invention is therefore also a process for the preparation of a liquid-crystal medium which is characterised in that one or more compounds of the formula I are mixed with one or more further compounds and optionally with one or more additives. The further compounds are preferably selected from the compounds of the formula II, as indicated above, and optionally one or more further compounds.

In the present application, the expression dielectrically positive describes compounds or components where $\Delta\epsilon > 3.0$, dielectrically neutral describes those where $-1.5 \leq \Delta\epsilon \leq 3.0$ and dielectrically negative describes those where $\Delta\epsilon < -1.5$. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\epsilon$ is defined as $(\epsilon_\| - \epsilon_\perp)$, while $\epsilon_{average}$ is $(\epsilon_\| + 2\epsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The term threshold voltage in the present application refers to the optical threshold and is quoted for 10% relative contrast ($V_{10}$), and the term saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties that are typical for liquid crystals are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\epsilon$) is determined at a frequency of 1 kHz. The threshold voltages, as well as all other electro-optical properties, are determined using test cells produced at Merck KGaA, Germany. The test cells for the determination of $\Delta\epsilon$ have a cell thickness of approximately 20 μm. The electrode is a circular ITO electrode having an area of 1.13 cm$^2$ and a guard ring. The orientation layers are SE-1211 from Nissan Chemicals, Japan, for homeotropic orientation ($\epsilon_\parallel$) and polyimide AL-1054 from Japan Synthetic Rubber, Japan, for homogeneous orientation ($\epsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages are determined under perpendicular observation. The threshold ($V_{10}$), mid-grey ($V_{50}$) and saturation ($V_{90}$) voltages are determined for 10%, 50% and 90% relative contrast, respectively.

The liquid-crystalline media are investigated with respect to their properties in the microwave frequency range as described in A. Penirschke et al. "Cavity Perturbation Method for Characterisation of Liquid Crystals up to 35 GHz", 34$^{th}$ European Microwave Conference—Amsterdam, pp. 545-548. Compare in this respect also A. Gaebler et al. "Direct Simulation of Material Permittivities . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) or quartz capillary. The capillary has an internal radius of 180 μm and an external radius of 350 μm. The effective length is 2.0 cm. The filled capillary is introduced into the centre of the cylindrical cavity with a resonance frequency of 19 GHz. This cavity has a length of 11.5 mm and a radius of 6 mm. The input signal (source) is then applied, and the result of the output signal is recorded using a commercial vector network analyser. For other frequencies, the dimensions of the cavity are adapted correspondingly.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in the above-mentioned publication A. Penirschke et al., 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnet is set correspondingly and then rotated correspondingly through 90°.

The dielectric anisotropy in the microwave region is defined as $$\Delta\epsilon_r \equiv (\epsilon_{r,\parallel} - \epsilon_{r,\perp}).$$

The modulatability or tuneability ($\tau$) is defined as $$\tau \equiv (\Delta\epsilon_r / \epsilon_{r,\parallel}).$$

The material quality ($\eta$) is defined as $$\eta \equiv (\tau / \tan \delta_{\epsilon r,max}),$$

with the maximum dielectric loss factor $\tan \delta_{\epsilon r,max}$:
$$\tan \delta_{\epsilon r,max} \equiv \max. \{\tan \delta_{\epsilon r,\perp}; \tan \delta_{\epsilon r,\parallel}\}$$
which arises from the maximum value of the measured values for $\tan \delta_{\epsilon r}$.

The material quality ($\eta$) of the preferred liquid-crystal materials is 6 or more, preferably 7 or more, preferably 10 or more, preferably 15 or more, particularly preferably 25 or more and very particularly preferably 30 or more.

In the corresponding components, the preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

The liquid-crystal media according to the invention preferably have nematic phases of in each case at least from −20° C. to 80° C., preferably from −30° C. to 85° C. and very particularly preferably from −40° C. to 100° C. The phase particularly preferably extends to 120° C. or more, preferably to 140° C. or more and very particularly preferably to 180° C. or more. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a cell thickness of 5 μm for at least 100 hours. At high temperatures, the clearing point is measured in capillaries by conventional methods.

The liquid-crystal media in accordance with the present invention preferably have a clearing point of 90° C. or more, more preferably 100° C. or more, even more preferably 120° C. or more, particularly preferably 150° C. or more and very particularly preferably 170° C. or more.

The $\Delta\epsilon$ of the liquid-crystal medium in accordance with the invention, at 1 kHz and 20° C., is preferably 1 or more, more preferably 2 or more and very preferably 3 or more.

The $\Delta n$ of the liquid-crystal media in accordance with the present invention, at 589 nm (Na$^D$) and 20° C., is preferably in the range from 0.20 or more to 0.90 or less, more preferably in the range from 0.25 or more to 0.90 or less, even more preferably in the range from 0.30 or more to 0.85 or less and very particularly preferably in the range from 0.35 or more to 0.80 or less.

In a preferred embodiment of the present application, the $\Delta n$ of the liquid-crystal media in accordance with the present invention is preferably 0.50 or more, more preferably 0.55 or more.

Furthermore, the liquid-crystal media according to the invention are characterised by high anisotropies in the microwave region. The birefringence is, for example, preferably 0.14 or more, particularly preferably 0.15 or more, particularly preferably 0.20 or more, particularly preferably 0.25 or more and very particularly preferably 0.30 or more, at about 8.3 GHz. In addition, the birefringence is preferably 0.80 or less.

The liquid crystals employed are either individual substances or mixtures. They preferably have a nematic phase.

In the present application, the term compounds means both one compound and a plurality of compounds, unless expressly stated otherwise.

Preferred components which comprise a liquid-crystal medium or at least one compound in accordance with the invention are phase shifters, varactors, antenna arrays (for example for radio, mobile communications, microwave/radar and other data transmission), 'matching circuit adaptive filters' and others. Preference is given to components for high-frequency technology, as defined above. Preference is also given to components which can be modulated by different applied electrical voltages. Very particularly preferred components are tuneable phase shifters. In preferred embodiments, a plurality of phase shifters are functionally connected, giving, for example, a phase-controlled group antenna, generally referred to as 'phased array' antenna. A group antenna uses the phase shift of the transmitting or receiving elements arranged in a matrix in order to achieve bundling through interference. A parallel arrangement of phase shifters in row or grid form enables the construction of a so-called 'phased array', which can serve as tuneable or passive transmitting or receiving antenna for high frequencies (for example gigahertz region). Phased array antennae according to the invention have a very broad usable reception cone.

Preferred applications are radar installations and data transmission equipment on manned or unmanned vehicles from the automobile, shipping, aircraft, space travel and satellite technology areas.

For the production of suitable components for high-frequency technology, in particular suitable phase shifters, a liquid-crystalline medium according to the invention is typically introduced into rectangular cavities having a thickness of less than 1 mm, a width of several mm and a length of several centimetres. The cavities have opposing electrodes mounted along two long sides. Such arrangements are familiar to the person skilled in the art. Through application of a variable voltage, the dielectric properties of the liquid-crystalline medium can be tuned during operation of the antenna in order to set different frequencies or directions of an antenna.

The expression "halogen" or "halogenated" stands for F, Cl, Br and I, particularly for F and Cl and in particular for F.

The expression "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The expression "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The expression "alkoxy" preferably encompasses straight-chain radicals of the formula $C_nH_{2n+1}$—O—, in which n denotes 1 to 10. n is preferably 1 to 6. Preferred alkoxy groups are, for example, methoxy, ethoxy, n-propoxy, n-butoxy, n-pentoxy, n-hexoxy, n-heptoxy, n-octoxy, n-nonoxy, n-decoxy.

The expression "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

The expression "fluorinated alkyl radical" preferably encompasses mono- or polyfluorinated radicals. Perfluorinated radicals are included. Particular preference is given to $CF_3$, $CH_2CF_3$, $CH_2CHF_2$, $CHF_2$, $CH_2F$, $CHFCF_3$ and $CF_2CHFCF_3$.

The expression "fluorinated alkoxy radical" encompasses mono- or polyfluorinated radicals. Perfluorinated radicals are preferred. Particular preference is given to the $OCF_3$ radical.

The expression "substituted cycloalkyl" encompasses cycloalkyl which is mono- or polysubstituted by alkyl, in particular alkyl having 1 to 8 carbon atoms.

The expression "substituted phenyl" encompasses phenyl which is mono- or polysubstituted by a group defined like $R^1$, in particular phenyl which is substituted by F, Cl, alkyl or alkoxy.

The expression "alk(en/yn)yl groups, in which one or more "—$CH_2$—" groups may be replaced by —O—" preferably relates to groups of this type in which a non-terminal $CH_2$— group is replaced. OH groups are included in the general meaning.

In the present application, high-frequency technology means applications having frequencies in the range from 1 MHz to 10 THz, preferably from 1 GHz to 3 THz, more preferably from 2 GHz to 1 THz, particularly preferably from 5 to 300 GHz. The application is preferably in the microwave spectrum or adjacent regions which are suitable for message transmission, in which phased array modules can be used in transmitting or receiving antennae.

The liquid-crystal media according to the invention consist of one or more compounds, preferably 2 to 30, more preferably 3 to 20 and very preferably 3 to 16, compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present application and in the following examples, the structures of the liquid-crystal compounds are indicated by means of acronyms, where the transformation into chemical formulae is carried out in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Suitable mixture components are given in Tables A and B.

TABLE A

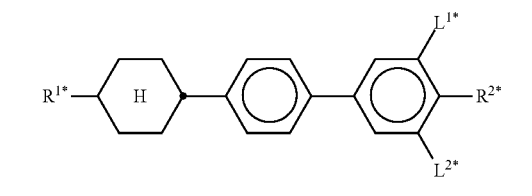

BCH

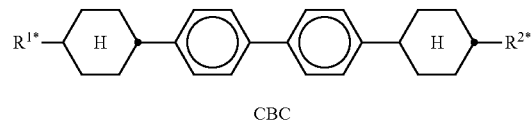

CBC

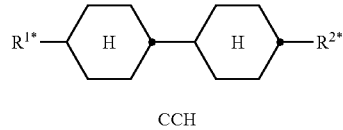

CCH

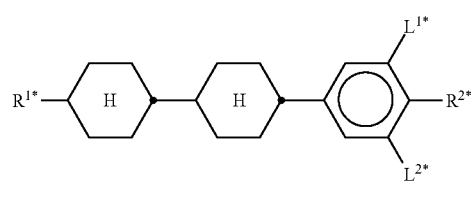

CCP

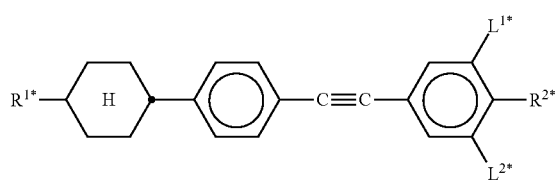

CPTP

TABLE A-continued

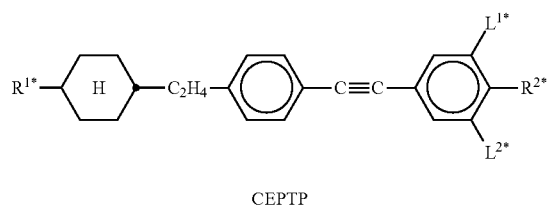

CEPTP

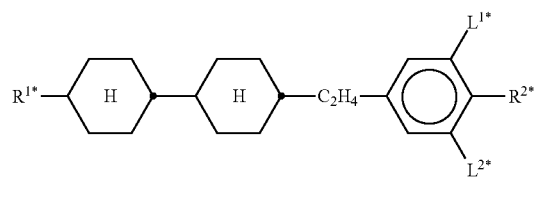

ECCP

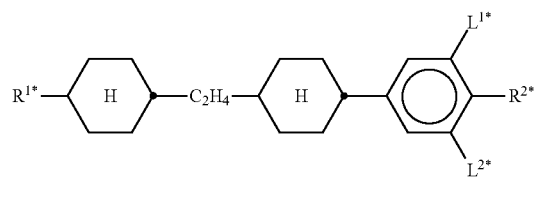

CECP

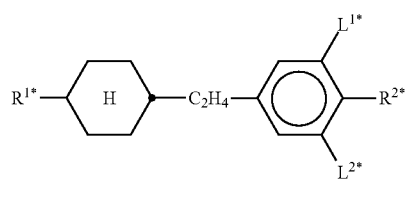

EPCH

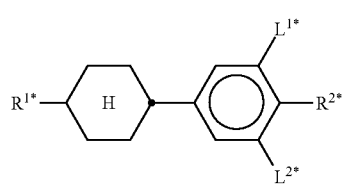

PCH

TABLE A-continued

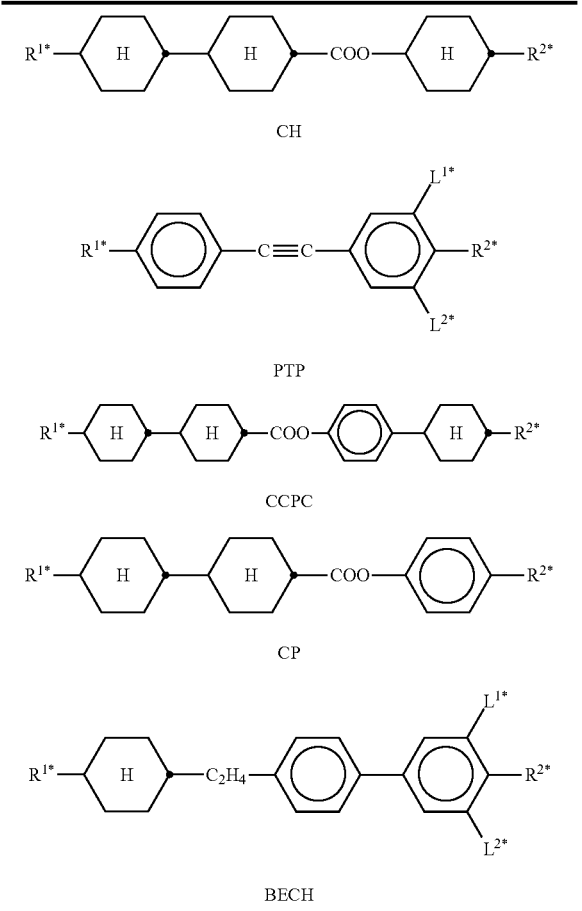

TABLE B

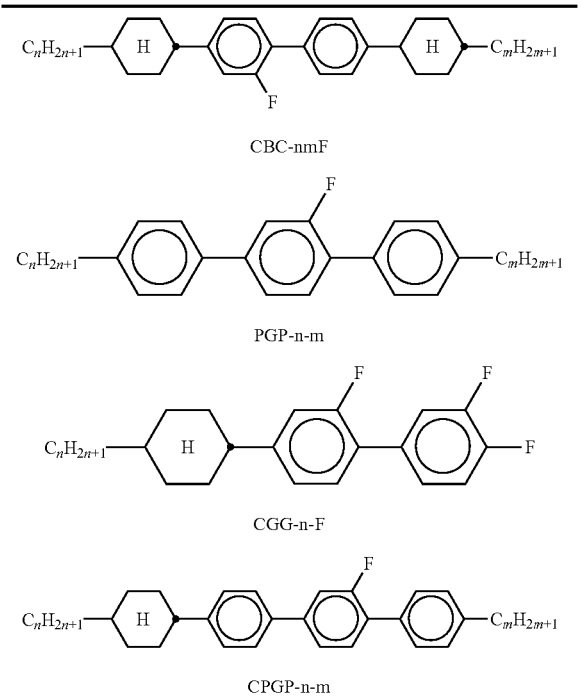

TABLE B-continued

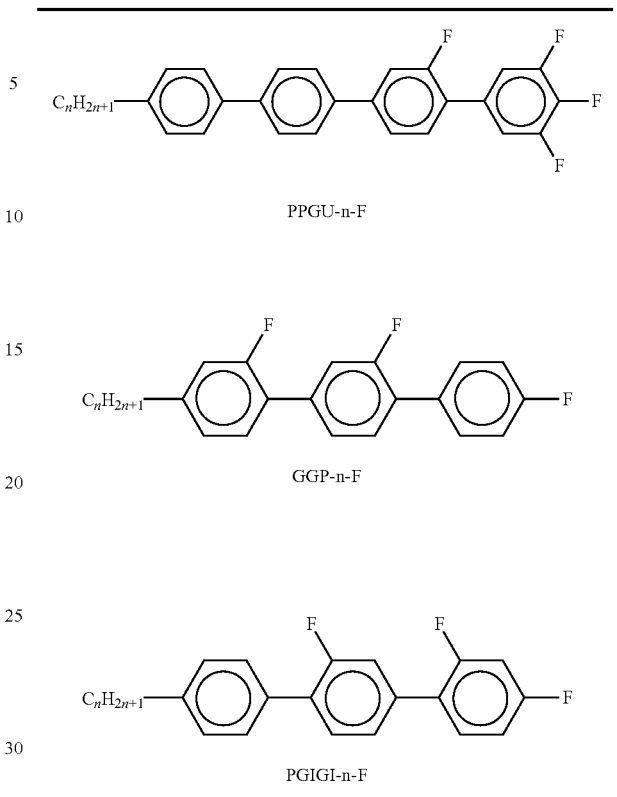

The following examples illustrate the present invention without limiting it in any way.

However, it becomes clear to the person skilled in the art from the physical properties what properties can be achieved and in what ranges they can be modified. In particular, the combination of the various properties which can preferably be achieved is thus well defined for the person skilled in the art.

In the present application, unless expressly stated otherwise, the plural form of a term denotes both the singular form and the plural form, and vice versa. Further combinations of the embodiments and variants of the invention in accordance with the description also arise from the attached claims.

Abbreviations Used:

MTB methyl tert-butyl ether $SiO_2$ silica gel

RT room temperature (about 20° C.)

EXAMPLES

The acetylenes and boronic acids employed are commercially available or can be prepared analogously to known syntheses which are known to the person skilled in the art. The radicals "$C_4H_9$" stand for unbranched n-butyl radicals. The same applies correspondingly to $C_3H_7$, $C_6H_{13}$, etc. The 1,1,2-trifluorotriethylsilylethene unit is synthesised in accordance with: F. Babudri, et al., *Eur. J. Org. Chem.* 2008, 1977-1982. Use thereof for the preparation of trans-1,2-difluoroethyl-1-iodo-2-aryl building blocks is described in: Babudri et al., *Synthesis* 2008, 1580-1588.

Synthesis Example 1

1.1 Synthesis of 1-bromo-3-ethyl-4-(4-n-butylphenylethynyl)benzene

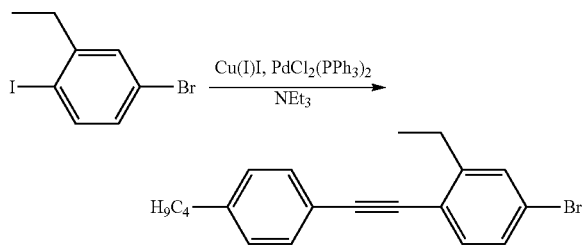

20 g (64.3 mmol) of 1-iodo-2-ethyl-4-bromobenzene and 12 g (64.3 mmol) of 4-n-hexylphenylacetylene are initially introduced in 300 ml of triethylamine, 250 mg (1.3 mmol) of copper(I) iodide and 900 mg (1.3 mmol) of bis(triphenylphosphine)palladium(II) chloride are added, and the mixture is stirred at RT for 3 h and subsequently refluxed for 1 h. The batch is cooled, water and heptane are added, and the phases are separated. The organic phase is washed with saturated sodium chloride soln., dried over sodium sulfate, filtered and evaporated in a rotary evaporator. The residue is purified by column chromatography (SiO$_2$, heptane); the product is obtained as a colourless oil.

1.2 Synthesis of 2-bromo-6-trifluoromethanesulfonylnaphthalene

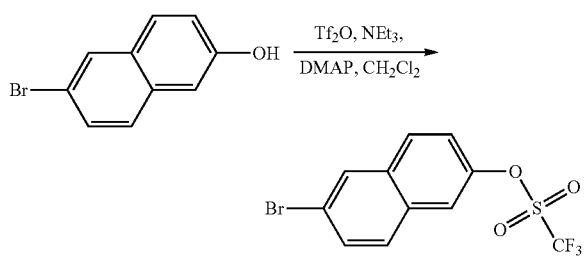

25 g (112 mmol) of 6-bromo-2-naphthol, 21.1 ml (157 mmol) of triethylamine and 266 mg of 4-dimethylaminopyridine are initially introduced in 300 ml of dichloromethane, the mixture is cooled in an ice bath, and 20 ml (123 mmol) of trifluoromethanesulfonic anhydride are added dropwise. The batch is stirred overnight and warmed to RT in the process. Water is subsequently carefully added, and the phases are separated. The organic phase is washed with saturated sodium chloride soln., dried over sodium sulfate, filtered and evaporated in a rotary evaporator. The residue is purified by column chromatography (SiO$_2$, heptane/dichloromethane=1:1); the product is obtained as a colourless oil.

1.3 Synthesis of 6-butyl-2-trifluoromethanesulfonylnaphthalene

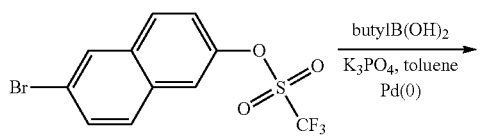

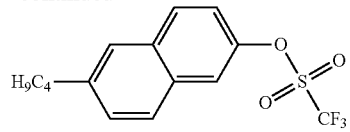

39.1 g (110 mmol) of the triflate and 13.5 g (132 mmol) of the boronic acid are refluxed for 16 h with 48.8 g (223 mmol) of potassium phosphate, 633 mg (1.1 mmol) of bis(dibenzylideneacetone)palladium(0) and 1.65 g (2.2 mmol) of 1,2,3,4,5-pentaphenyl-1-di-tertiary-butylphosphinoferrocene in 875 ml of toluene.

The batch is cooled, water is added, and the phases are separated. The aqueous phase is extracted with toluene, and the combined organic phases are washed with saturated sodium chloride solution, dried over sodium sulfate, filtered and evaporated in a rotary evaporator. The residue is purified by column chromatography (SiO$_2$, heptane/MTB=9:1); the further purification is carried out by recrystallisation from ethanol.

1.4 Synthesis of 6-butyl-2-(trimethylsilylacetylenyl)naphthalene

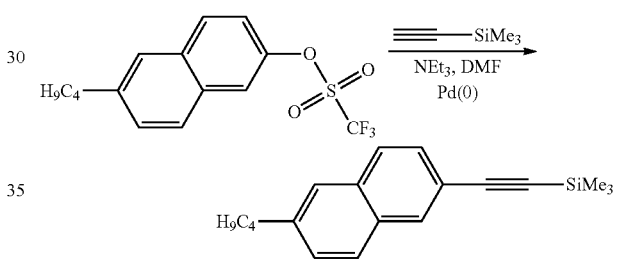

32.5 g (~84 mmol) of the triflate and 35.4 ml (252 mmol) of the acetylene are refluxed for 16 h with 29.1 ml (210 mmol) of triethylamine and 2.95 g (4.2 mmol) of bis(triphenylphosphine)palladium(II) chloride in 130 ml of dimethylformamide.

The batch is cooled, water is added, and the mixture is extracted with MTB. The organic phase is washed with saturated sodium chloride solution, dried over sodium sulfate, filtered and evaporated in a rotary evaporator. The residue is employed in the next reaction without further purification.

1.5 Synthesis of 6-butyl-2-acetylenylnaphthalene

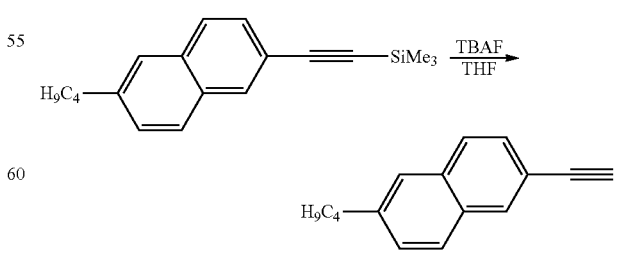

39.7 g (~85 mmol) of the silyl-protected acetylene are initially introduced in 250 ml of tetrahydrofuran, and 26.6 g (102 mmol) of tetra-n-butylammonium fluoride. After 16 h at RT, water and MTB are added to the batch, and the phases are separated. The aqueous phase is extracted with MTB, and the combined organic phases are washed with saturated sodium chloride solution, dried over sodium sulfate, filtered and evaporated in a rotary evaporator.

The residue is purified by column chromatography (SiO$_2$, heptane); the further purification is carried out by recrystallisation from ethanol.

1.6 Synthesis of 146-n-butyl-2-naphthylethynyl)-3-ethyl-4-(4-n-hexylphenylethynyl)benzene

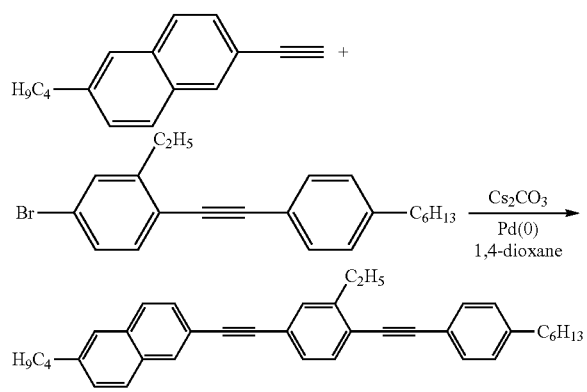

69 mg (264 µmol) of bis(acetonitrile)palladium(II) chloride, 378 mg (792 µmol) of 2-dicyclohexylphosphino-2',4',6'-triisopropylbiphenyl and 18.9 g of caesium carbonate (58 mmol) in 79 ml of 1,4-dioxane are added to 5.5 g (26.4 mmol) of the acetylene and 9.75 g (26.4 mmol) of the bromide.

The batch is stirred at 100° C. for 16 h and cooled, water and MTB are added, and the phases are separated. The aqueous phase is extracted with MTB, and the combined organic phases are washed with saturated sodium chloride solution, dried over sodium sulfate, filtered and evaporated in a rotary evaporator. The residue is purified by column chromatography (SiO$_2$, heptane); the further purification is carried out by recrystallisation from isopropanol.

MS (EI): m/e (%)=496 (100, M$^+$), 453 (11, [M-propyl]$^+$).
Δ∈=+1.7
Δn=0.45
C, 79; N, 178, I.

Synthesis Example 2

2.1 Synthesis of 2-iodo-6-bromonaphthalene

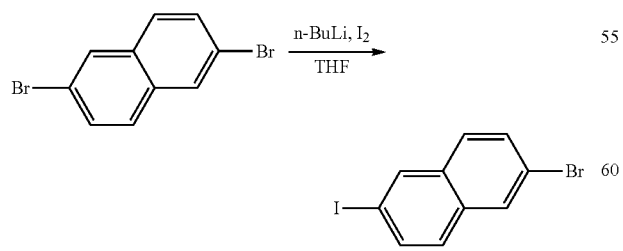

46.8 g (164 mmol) of 2,6-dibromonaphthalene are initially introduced in 400 ml of THF, the mixture is cooled to −70° C., and 110 ml of n-BuLi (1.6 M in hexane, 175 mmol) are added dropwise. After 1 h, 47 g of iodine (185 mmol) in 100 ml of THF are added dropwise, and the mixture is stirred at −70° C. for a further 2 h, warmed to −30° C. and quenched by the addition of 30 ml (386 mmol) of aqueous sodium hydrogensulfite solution (w=39%).

The phases are separated, and the aqueous phase is extracted 1× with MTB. The combined organic phases are washed with saturated sodium chloride soln., dried over sodium sulfate, filtered and evaporated in a rotary evaporator. The further purification of the residue is carried out by recrystallisation from heptane/toluene=2:1.

2-Iodo-6-bromonaphthalene is obtained as a yellow solid.

2.2 Synthesis of 2-bromo-6-(2-ethyl-4-n-butylphenylethynyl)naphthalene

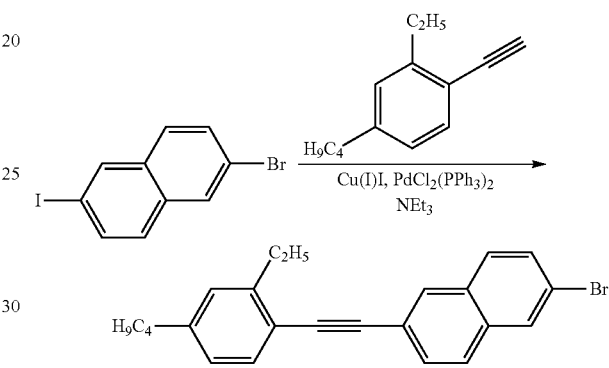

16 g (48 mmol) of 2-iodo-6-bromonaphthalene and 10 g (48 mmol) of 2-ethyl-4-n-butylphenylacetylene are initially introduced in 250 ml of triethylamine, 200 mg (1 mmol) of copper(I) iodide and 720 mg (1 mmol) of bis(triphenylphosphine)palladium(II) chloride are added, and the mixture is refluxed for 16 h.

The batch is cooled, water and MTB are added, and the phases are separated. The organic phase is washed with saturated sodium chloride soln., dried over sodium sulfate, filtered and evaporated in a rotary evaporator. The residue is purified by column chromatography (SiO$_2$, heptane).

2.3 Synthesis of 2-(2-ethyl-4-n-butylphenylethynyl)naphthalene-6-boronic acid

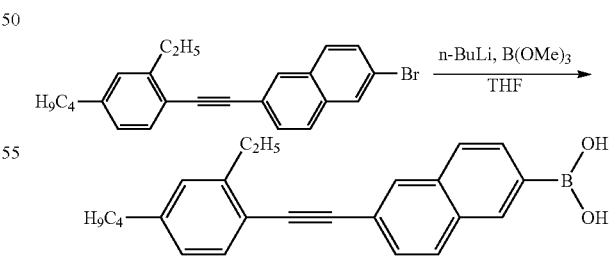

7 g (17.8 mmol) of the bromide are initially introduced in 50 ml of THF, the mixture is cooled to −70° C., and 12.5 ml of n-BuLi (1.6 M in hexane, 19.9 mmol) are added dropwise. After 30 minutes, 2.3 ml of trimethyl borate (20.2 mmol) are added dropwise, and the mixture is stirred at −70° C. for a further 30 minutes, warmed to 0° C. and hydrolysed by the addition of water.

The batch is acidified using dilute hydrochloric acid and extracted twice with MTB. The combined organic phases are washed with saturated sodium chloride soln., dried over sodium sulfate, filtered and evaporated in a rotary evaporator. The further purification of the residue is carried out by recrystallisation from heptane.

2.4 Synthesis of 2-(2-ethyl-4-n-butylphenylethynyl)-6-[E-1,2-difluoro-2-(4-n-butylphenyl)ethylenyl]naphthalene

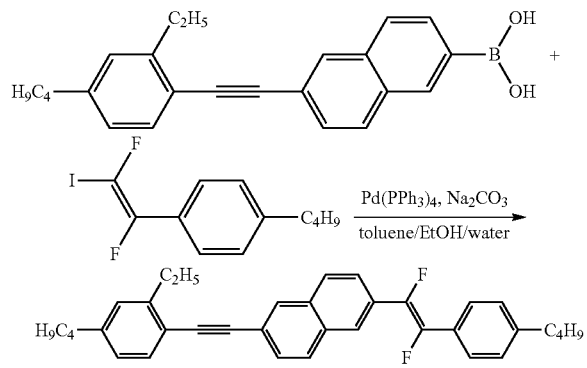

4.9 g (13.8 mmol) of the boronic acid and 6.5 g (18.4 mmol) of the iodide are initially introduced in 35 ml of toluene, and 4.3 g (40.6 mmol) of sodium carbonate in 6.5 ml of water and 22 ml of ethanol are added, before 780 mg (6.75 mmol) of tetrakis(triphenylphosphine)palladium(0) are added. The batch is refluxed for 16 h and cooled, and the phases are separated. The aqueous phase is extracted with MTB, and the combined organic phases are washed with saturated sodium chloride solution, dried over sodium sulfate, filtered and evaporated in a rotary evaporator. The residue is purified by column chromatography ($SiO_2$, heptane); the further purification is carried out by recrystallisation from isopropanol.

MS (EI): m/e (%)=506 (100, $M^+$), 463 (15, $[M\text{-propyl}]^+$), 210 (17, $[M\text{-}2\times\text{propyl}]^{2+}$).
$\Delta\varepsilon=+2.4$
$\Delta n=0.46$
$\gamma_1=2213$ mPa·s
C, 72; N, 235; I.

The following are synthesised analogously to Example 1 and/or 3:

3) 1-(6-n-Butyl-2-naphthylethynyl)-2-ethyl-4-(4-n-hexylphenylethynyl)benzene

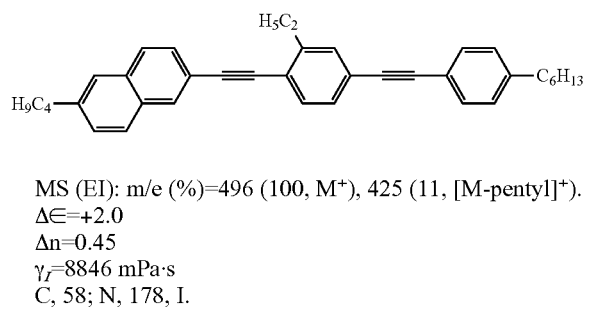

MS (EI): m/e (%)=496 (100, $M^+$), 425 (11, $[M\text{-pentyl}]^+$).
$\Delta\varepsilon=+2.0$
$\Delta n=0.45$
$\gamma_1=8846$ mPa·s
C, 58; N, 178, I.

4) 2-(2-Ethyl-4-n-butylphenylethynyl)-6-(4-n-butylphenylethynyl)naphthalene

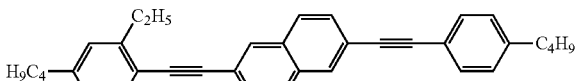

MS (EI): m/e (%)=468 (100, $M^+$), 425 (20, $[M\text{-propyl}]^+$), 191 (16, $[M\text{-}2\times\text{propyl}]^{2+}$).
$\Delta\varepsilon=+3.0$
$\Delta n=0.47$
$\gamma_1=3442$ mPa·s
C, 97; N, 196; I.

5) Bis-2,6-(2-ethyl-4-n-butylphenylethynyl)naphthalene

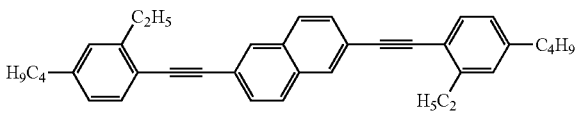

MS (EI): m/e (%)=496 (100, $M^+$), 453 (13, $[M\text{-propyl}]^+$), 205 (12, $[M\text{-}2\times\text{propyl}]^{2+}$).
$\Delta\varepsilon=+0.9$
$\Delta n=0.425$
$\gamma_1=3538$ mPa·s
C, 138; I.

6) Bis-2,6-(4-n-butylphenylethynyl)naphthalene

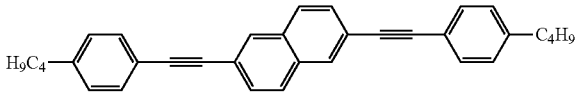

MS (EI): m/e (%)=440 (100, $M^+$), 397 (31, $[M\text{-propyl}]^+$), 354 (19, $[M\text{-}2\times\text{propyl}]^+$), 177 (19, $[M\text{-}2\times\text{propyl}]^{2+}$).
$\Delta\varepsilon=+3.2$
$\Delta n=0.52$
C, 165; N, 263; I.

7) 2-(5-n-Butylthiophen-1-ethynyl)-6-(2-ethyl-4-n-butylphenylethynyl)naphthalene

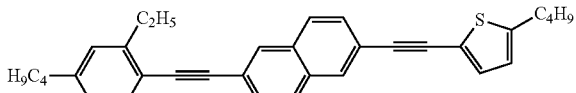

MS (EI): m/e (%)=474 (100, $M^+$), 431 (27, $[M\text{-propyl}]^+$), 194 (18, $[M\text{-}2\times\text{propyl}]^{2+}$).
$\Delta\varepsilon=+1.8$
$\Delta n=0.47$
$\gamma_1=2489$ mPa·s
C, 66; N, 105; I.

8) 2-(2-Ethyl-4-n-butylphenylethynyl)-6-(4-n-butylphenylethynyl)-3,4,5-trifluoronaphthalene

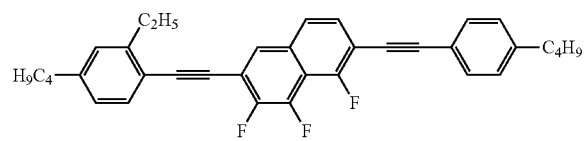

9) 1-(6-n-Butylthio-2-naphthylethynyl)-2-ethyl-4-(4-n-hexylphenylethynyl)benzene

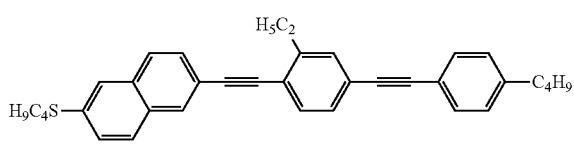

MS (EI): m/e (%)=500 (100, M⁺), 485 (2), 457 (5), 443 (5), 429 (2), 400 (10), 385 (5).
Δ∈=+3.3
Δn=0.51
$\gamma_1$=12740 mPa·s
C, 120; N, 175; I.

10) 1-(6-n-Butylthio-2-naphthylethynyl)-2-ethyl-4-(3,4,5-trifluorophenylethynyl)benzene

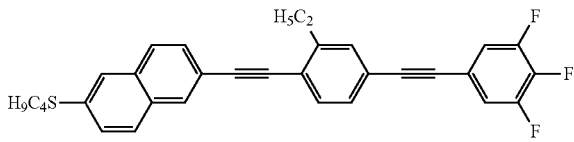

MS (EI): m/e (%)=498 (100, M⁺), 483 (3), 441 (9), 427 (10), 407 (5), 393 (10), 382 (4).
Δ∈=+11.4
Δn=0.46
$\gamma_1$=4180 mPa·s
C, 83; N, 107; I.

Mixture Examples

A liquid-crystal medium C-1 as reference base mixture having the composition and properties as indicated in the following table is prepared.

| No. | Composition Compound Abbreviation | |
|---|---|---|
| 1 | BCH-3F.F | 12.0% |
| 2 | BCH-5F.F | 10.0% |
| 3 | ECCP-30CF3 | 5.00% |
| 4 | ECCP-50CF3 | 5.00% |
| 5 | CBC-33F | 2.00% |
| 6 | CBC-53F | 2.00% |
| 7 | CBC-55F | 2.00% |
| 8 | PCH-6F | 8.00% |
| 9 | PCH-7F | 6.00% |
| 10 | CCP-20CF3 | 8.00% |
| 11 | CCP-30CF3 | 12.0% |
| 12 | CCP-40CF3 | 7.00% |
| 13 | CCP-50CF3 | 11.0% |
| 14 | PCH-5F | 10.0% |
| Σ | | 100.0% |

Physical properties

T(N, I) = 92.6° C.
Δn (20° C., 589.3 nm) = 0.094
Δε (20° C., 1 kHz) = 5.4

In each case, 10% by weight of a test substance from the synthesis examples are added to this medium, and the mixture is homogenised and measured with respect to the physical properties.

Mixture Example M-1

10% of 1-(6-n-butyl-2-naphthylethynyl)-3-ethyl-4-(4-n-hexylphenylethynyl)benzene (Synthesis Example 1, step 1.6)
90% of C-1

Mixture Example M-2

10% of 2-(2-ethyl-4-n-butylphenylethynyl)-6-[E-1,2-difluoro-2-(4-n-butylphenyl)ethylenyl]naphthalene (Synthesis Example 2, step 2.4)
90% of C-1

The results and the comparison with base mixture C-1 are shown in Table 1.

Mixtures M-1/2 are used for applications in the microwave region, in particular for phase shifters for 'phased array' antennae.

TABLE 1

Properties of the mixtures at 19 GHz (20° C.)

| Medium | $\epsilon_{r,\parallel}$ | $\epsilon_{r,\perp}$ | τ | tan $\delta_{\epsilon,r,\parallel}$ | tan $\delta_{\epsilon,r,\perp}$ | η |
|---|---|---|---|---|---|---|
| M-1 | 2.66 | 2.30 | 0.134 | 0.0042 | 0.0113 | 11.9 |
| M-2 | 2.66 | 2.30 | 0.136 | 0.0043 | 0.0114 | 11.9 |
| C-1 | 2.56 | 2.29 | 0.105 | 0.0050 | 0.0139 | 8.5 |

The tuneability τ and the material quality η are significantly improved compared with comparative mixture C-1. The dielectric loss factors tan $\delta_{\epsilon,r}$ are reduced.

The invention claimed is:

1. A component for a high-frequency product comprising a compound of formula I

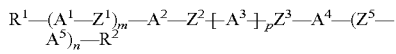

in which
$A^1$, $A^2$, $A^3$, $A^4$, $A^5$ each, independently of one another, denote
a) 1,4-phenylene, in which one or more CH groups may be replaced by N, or a 2,6-naphthylene group of the formula

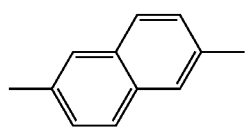

b) a radical from the group thiophene-2,5-diyl, furan-2,5-diyl or a group of the formula

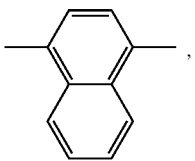

or c) trans-1,4-cyclohexylene or cyclohexenylene, in which, one or two non-adjacent CH$_2$ groups may be replaced by —O— and/or —S—, and in which H may be replaced by F, 1,4-bicyclo[2.2.2]octylene, cyclobutane-1,3-diyl or spiro[3.3]heptane-2,6-diyl, and in which, groups a), b) and c), one or more H atoms may also be substituted by a group as defined for L, where one or more of the groups A$^2$, A$^3$ and A$^4$ denote a group of the formula

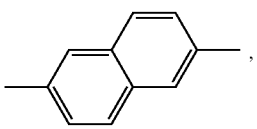

L independently denotes branched or unbranched alkyl having 1 to 12 C atoms, alkenyl or alkynyl having 2 to 12 C atoms, in which in each case, independently of one another, one or more hydrogen atoms may be replaced by F or Cl and one or more —CH$_2$— groups may be replaced by O , or denotes C$_3$-C$_6$ cycloalkyl or C$_3$-C$_6$ cycloalkenyl, F, Cl, Br, CN, NCS, SCN or SF$_5$, Z$^2$, Z$^3$ independently denote —C≡C— or

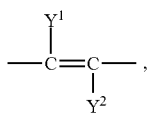

Y$^1$, Y$^2$, independently of one another, denote H, F, Cl, C$_1$-C$_{10}$ alkyl, Z$^1$, Z$^5$, independently of one another, denote a single bond, —C≡C—, —CH=CH—, —CH$_2$O—, —(CO)O—, —CF$_2$O—, —CF$_2$CF$_2$—, —CH$_2$CF$_2$—, —CH$_2$CH$_2$—, —(CH$_2$)$_4$—, —CH=CF— or —CF=CF—, where asymmetrical bridges may be oriented to both sides, R$^1$ and R$^2$, independently of one another, denote a halogenated or unsubstituted alkyl radical having 1 to 15 C atoms, where one or more CH$_2$ groups in these radicals may each be replaced, independently of one another, by —C≡C—, —CH=CH—, —CF=CF—, —CF=CH—, —CH=CF—, —(CO)—, —S— or —O— in such a way that S or O atoms are not linked directly to one another, or denote F, Cl, Br, CN, CF$_3$, OCF$_3$, —NCS or SF$_5$, R$^2$ also denotes H, m, n, independently of one another, denote 0, 1 or 2, and p denotes 1 or 2.

2. A component for a high-frequency product according to claim 1, wherein in the compound of formula I, A$^2$, A$^3$ and A$^4$ are substituted by a total of at least one group L.

3. A component for a high-frequency product according to claim 1, wherein in the compound of formula I, A$^3$ is a 1,4-phenylene ring which is optionally substituted by L.

4. A component for a high-frequency product according to claim 1, wherein in the compound of formula I, A$^2$ and A$^4$ denote an optionally substituted 1,4-phenylene ring.

5. A component for a high-frequency product according to claim 1, wherein in the compound of formula I, m+n+p is 1 or 2.

6. A compound of formula I*

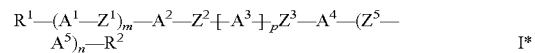

in which

A$^1$, A$^2$, A$^3$, A$^4$, A$^5$ each, independently of one another, denote a) 1,4-phenylene, in which one or more CH groups may be replaced by N, or a 2,6-naphthylene group of the formula

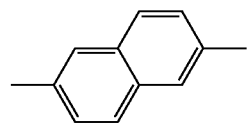

b) a radical from the group thiophene-2,5-diyl, furan-2,5-diyl or a group of the formula

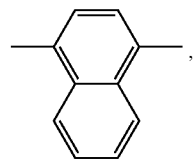

or c) trans-1,4-cyclohexylene or cyclohexenylene, in which one or two non-adjacent CH$_2$ groups may be replaced by —O— and/or —S—, and in which H may be replaced by F, 1,4-bicyclo[2.2.2]octylene, cyclobutane-1,3-diyl or spiro[3.3]heptane-2,6-diyl, and in which groups a), b) and c), one or more H atoms may also be substituted by a group as defined for L, where one or more of the groups A$^2$, A$^3$ and A$^4$ denote a group of the formula

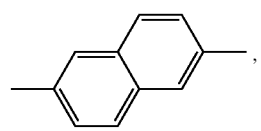

and where the groups A$^2$, A$^3$ and A$^4$ are substituted by a total of one or more groups L, L independently denotes branched or unbranched alkyl having 1 to 12 C atoms, alkenyl or alkynyl having 2 to 12 C atoms, in which in each case, independently of one another, one or more hydrogen atoms may be replaced by F or Cl and one or more —CH$_2$— groups may be replaced by O, or denotes C$_3$-C$_6$ cycloalkyl or C$_3$-C$_6$ cycloalkenyl,
F, Cl, Br, CN, NCS, SCN or SF$_5$,
Z$^2$, Z$^3$ independently denote —C≡C— or

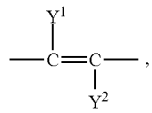

Y$^1$, Y$^2$, independently of one another, denote H, F, Cl, C$_1$-C$_{10}$ alkyl,
Z$^1$, Z$^5$, independently of one another, denote a single bond, —C≡C—, —CH=CH—, —CH$_2$O—, —(CO)O—, —CF$_2$O—, —CF$_2$CF$_2$—, —CH$_2$CF$_2$—, —CH$_2$CH$_2$—, —(CH$_2$)$_4$—, —CH=CF— or —CF=CF—, where asymmetrical bridges may be oriented to both sides,
R$^1$ and R$^2$, independently of one another, denote a halogenated or unsubstituted alkyl radical having 1 to 15 C atoms, where one or more CH$_2$ groups in these radicals may each be replaced, independently of one another, by —C≡C—, —CH=CH—, —CF=CF—, —CF=CH—, —CH=CF—, —(CO)—, —S— or —O— in such a way that S or O atoms are not linked directly to one another,
or denote F, Cl, Br, CN, CF$_3$, OCF$_3$ or SF$_5$,
R$^2$ also denotes H,
m, n, independently of one another, denote 0, 1 or 2, and
p denotes 1 or 2.

7. A compound according to claim 6, wherein
R$^1$ and R$^2$, independently of one another, denote a halogenated or unsubstituted alkyl radical having 1 to 15 C atoms, where one or more CH$_2$ groups in these radicals may each be replaced, independently of one another, by —C≡C—, —CH=CH—, —CF=CF—, —CF=CH—, —CH=CF—, —(CO)— or —O— in such a way that O atoms are not linked directly to one another.

8. A liquid-crystal medium, comprising a compound of formula I* according to claim 6.

9. A liquid-crystal medium according to claim 8, which additionally comprises one or more compounds selected from the compounds of formula II:

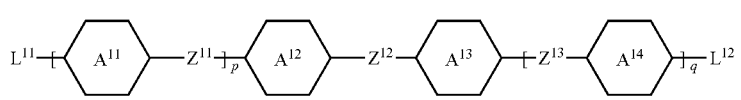

in which:
L$^{11}$ denotes R$^{11}$ or X$^{11}$,
L$^{12}$ denotes R$^{12}$ or X$^{12}$,
R$^{11}$ and R$^{12}$, independently of one another, denote unfluorinated alkyl or unfluorinated alkoxy having 1 to 17 C atoms or unfluorinated alkenyl, unfluorinated alkynyl, unfluorinated alkenyloxy or unfluorinated alkoxyalkyl having 2 to 15 C atoms,
X$^{11}$ and X$^{12}$, independently of one another, denote F, Cl, Br, —CN, —NCS, —SCN, —SF$_5$, fluorinated alkyl or fluorinated alkoxy having 1 to 7 C atoms or fluorinated alkenyl, fluorinated alkenyloxy or fluorinated alkoxyalkyl having 2 to 7 C atoms,
p, q independently denote 0 or 1,
Z$^{11}$ to Z$^{13}$, independently of one another, denote trans-CH=CH—, trans-CF=CF—, —C≡C— or a single bond, and

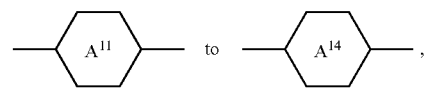

independently of one another, denote

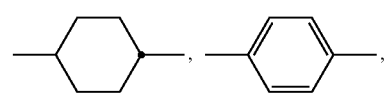

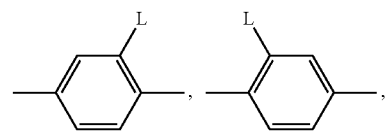

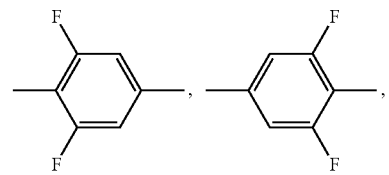

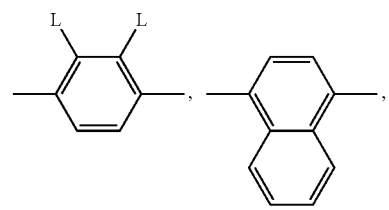

-continued

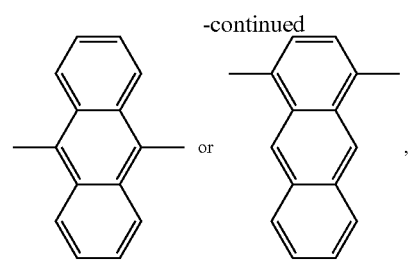

in which L independently denotes branched or unbranched alkyl, alkenyl or alkynyl having 1 to 12 C atoms, in which, independently of one another, one or more —CH$_2$— groups may also be replaced by O, or denotes C$_3$-C$_6$ cycloalkyl, C$_3$-C$_6$ cycloalkenyl, fluorinated alkyl or alkenyl, fluorinated alkoxy or alkenyloxy, F, Cl, Br, CN, NCS, SCN or SF$_5$.

10. A liquid-crystal medium, comprising a compound of formula I

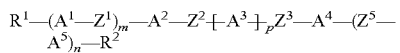    I in which

A$^1$, A$^2$, A$^3$, A$^4$, A$^5$ each, independently of one another, denote a) 1,4-phenylene, in which one or more CH groups may be replaced by N, or a 2,6-naphthylene group of the formula

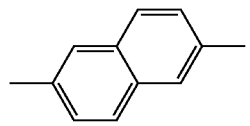

b) a radical from the group thiophene-2,5-diyl, furan-2,5-diyl or a group of the formula

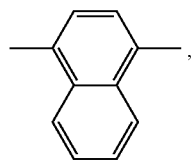

or c) trans-1,4-cyclohexylene or cyclohexenylene, in which one or two non-adjacent CH$_2$ groups may be replaced by —O— and/or —S—, and in which H may be replaced by F, 1,4-bicyclo[2.2.2]octylene, cyclobutane-1,3-diyl or spiro[3.3]heptane-2,6-diyl, and in which groups a), b) and c), one or more H atoms may also be substituted by a group as defined for L, where one or more of the groups A$^2$, A$^3$ and A$^4$ denote a group of the formula

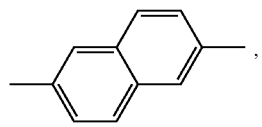

L independently denotes branched or unbranched alkyl having 1 to 12 C atoms, alkenyl or alkynyl having 2 to 12 C atoms,
in which in each case, independently of one another, one or more hydrogen atoms may be replaced by F or Cl and one or more —CH$_2$— groups may be replaced by O, or denotes C$_3$-C$_6$ cycloalkyl or C$_3$-C$_6$ cycloalkenyl, F, Cl, Br, CN, NCS, SCN or SF$_5$, Z$^2$, Z$^3$ independently denote —C≡C— or

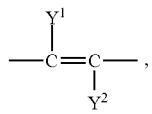

Y$^1$, Y$^2$, independently of one another, denote H, F, Cl, C$_1$-C$_{10}$ alkyl, Z$^1$, Z$^5$, independently of one another, denote a single bond, —C≡C—, —CH=CH—, —CH$_2$O—, —(CO)O—, —CF$_2$O—, —CF$_2$CF$_2$—, —CH$_2$CF$_2$—, —CH$_2$CH$_2$—, —(CH$_2$)$_4$—, —CH=CF— or —CF=CF—, where asymmetrical bridges may be oriented to both sides, R$^1$ and R$^2$, independently of one another, denote a halogenated or unsubstituted alkyl radical having 1 to 15 C atoms, where one or more CH$_2$ groups in these radicals may each be replaced, independently of one another, by —CH=CH—, —CF=CF—, —CF=CF—, —CF=CH—, —CH=CF—, —(CO)—, —S— or —O— in such a way that S or O atoms are not linked directly to one another, or denote F, Cl, Br, CN, CF$_3$, OCF$_3$, —NCS or SF$_5$, R$^2$ also denotes H, m, n, independently of one another, denote 0, 1 or 2, and p denotes 1 or 2.

11. A process for the preparing a liquid-crystal medium according to claim 10, wherein one or more compounds of formula I are mixed with one or more further compounds and optionally with one or more additives.

12. A component for a high-frequency product, which comprises a compound of formula I* according to claim 6.

13. A component according to claim 12, which is a phase shifter or a plurality of functionally connected phase shifters or a phased array antenna, where the component is optionally tuneable.

14. A phased array antenna, which comprises one or more components according to claim 12.

15. A liquid-crystal medium according to claim 10, wherein the concentration of the compounds of formula I in the medium is in the range from in total 5% to 95%.

16. A liquid-crystal medium according to claim 10, which additionally comprises one or more compounds selected from the compounds of formula II:

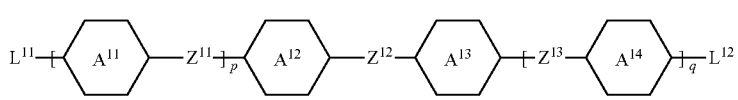    II in which:

$L^{11}$ denotes $R^{11}$ or $X^{11}$, $L^{12}$ denotes $R^{12}$ or $X^{12}$, $R^{11}$ and $R^{12}$, independently of one another, denote unfluorinated alkyl or unfluorinated alkoxy having 1 to 17 C atoms or unfluorinated alkenyl, unfluorinated alkynyl, unfluorinated alkenyloxy or unfluorinated alkoxyalkyl having 2 to 15 C atoms, $X^{11}$ and $X^{12}$, independently of one another, denote F, Cl, Br, —CN, —NCS, —SCN, —SF$_5$, fluorinated alkyl or fluorinated alkoxy having 1 to 7 C atoms or fluorinated alkenyl, fluorinated alkenyloxy or fluorinated alkoxyalkyl having 2 to 7 C atoms, p, q independently denote 0 or 1, $Z^{11}$ to $Z^{13}$, independently of one another, denote trans-CH=CH—, trans-CF=CF—, —C≡C— or a single bond, and

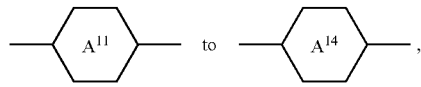

independently of one another, denote

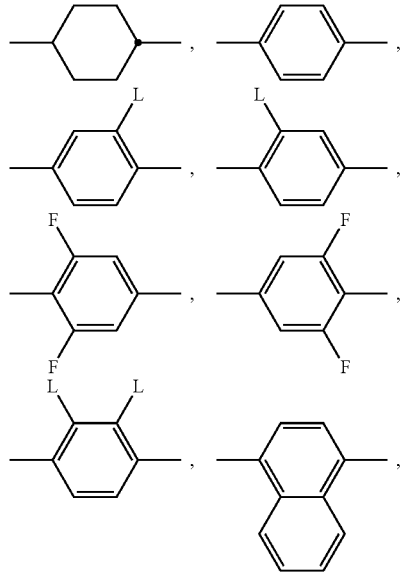

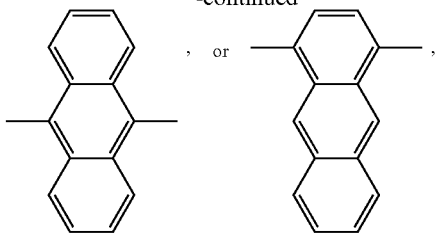

in which L independently denotes branched or unbranched alkyl, alkenyl or alkynyl having 1 to 12 C atoms, in which, independently of one another, one or more —CH$_2$— groups may also be replaced by O, or denotes C$_3$-C$_6$ cycloalkyl, C$_3$-C$_6$ cycloalkenyl, fluorinated alkyl or alkenyl, fluorinated alkoxy or alkenyloxy, F, Cl, Br, CN, NCS, SCN or SF$_5$.

17. A component according to claim 1, which is a phase shifter or a plurality of functionally connected phase shifters or a phased array antenna, where the component is optionally tuneable.

18. antenna, which comprises one or more components according to claim 1.

19. A component for a high-frequency product according to claim 1, wherein in the compound of formula I, m and n are both 0.

20. A compound according to claim 6, wherein $A^3$ denotes a 2,6-naphthylene group of the formula

21. A compound according to claim 6, wherein $R^1$ and $R^2$, independently of one another, denote a halogenated or unsubstituted alkyl radical having 1 to 15 C atoms, where one or more CH$_2$ groups in these radicals may each be replaced, independently of one another, by —C≡C—, —CH=CH—, —CF=CF—, —CF=CH—, —CH=CF— or —(CO)—.

22. A compound according to claim 6, wherein

L independently denotes alkenyl or alkynyl having 2 to 12 C atoms, in which in each case, independently of one another, one or more hydrogen atoms may be replaced by F or Cl and one or more —CH$_2$— groups may be replaced by O, or denotes C$_3$-C$_6$ cycloalkyl or C$_3$-C$_6$ cycloalkenyl, F, Cl, Br, CN, NCS, SCN or SF$_5$.

* * * * *